US008553665B2

(12) United States Patent
Du et al.

(10) Patent No.: US 8,553,665 B2
(45) Date of Patent: *Oct. 8, 2013

(54) METHOD FOR ACCESSING HYBRID NETWORK, AND GATEWAY APPARATUS, WIRELESS TERMINAL AND COMMUNICATION SYSTEM THEREOF

(75) Inventors: Lei Du, Beijing (CN); Yong Bai, Beijing (CN); Lan Chen, Beijing (CN); Hidetoshi Kayama, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 13/417,988

(22) Filed: Mar. 12, 2012

(65) Prior Publication Data
US 2012/0207049 A1    Aug. 16, 2012

Related U.S. Application Data

(62) Division of application No. 12/563,865, filed on Sep. 21, 2009, now Pat. No. 8,311,022, which is a division of application No. 11/583,651, filed on Oct. 18, 2006, now Pat. No. 8,160,048.

(30) Foreign Application Priority Data

Oct. 19, 2005  (CN) .............................. 200510109212

(51) Int. Cl.
*H04W 4/00* (2009.01)
(52) U.S. Cl.
USPC ............ 370/338; 370/351; 370/395.4; 455/7; 455/11.1; 455/13.1
(58) Field of Classification Search
None
See application file for complete search history.

(56) References Cited

U.S. PATENT DOCUMENTS

| 5,181,200 A | 1/1993 | Harrison |
| 5,295,154 A | 3/1994 | Meier et al. |
| 5,394,436 A | 2/1995 | Meier et al. |
| 5,628,055 A | 5/1997 | Stein |

(Continued)

FOREIGN PATENT DOCUMENTS

| DE | 10309228 | 9/2004 |
| GB | 2269723 | 2/1994 |
| JP | 2005-500745 | 1/2005 |
| WO | 01/01717 | 1/2001 |

OTHER PUBLICATIONS

Office Action mailed May 10, 2011 for U.S. Appl. No. 11/583,651, 16 pages.

(Continued)

*Primary Examiner* — Ian N Moore
*Assistant Examiner* — Brian T Le
(74) *Attorney, Agent, or Firm* — Blakely, Sokoloff, Taylor & Zafman LLP

(57) ABSTRACT

A method for accessing a hybrid network and a gateway communication system are disclosed. The method comprises: sensing by a gateway apparatus a relay request slot on a downlink common control channel of the wide area network; transmitting by a wireless terminal a relay request signal requesting to relay a data packet to be transmitted, in the relay request slot on the downlink common control channel; and if the relay request signal from the wireless terminal is sensed in the relay request slot, establishing by the gateway apparatus a connection with the wireless terminal in a distributed network environment. As such, the gateway apparatus accesses the wireless distributed network only when the surrounding wireless terminals require data relay, without sensing signals on both networks simultaneously.

12 Claims, 17 Drawing Sheets

(56) References Cited

U.S. PATENT DOCUMENTS

| | | | |
|---|---|---|---|
| 5,657,345 | A | 8/1997 | Lazaridis |
| 5,732,074 | A | 3/1998 | Spaur et al. |
| 5,907,541 | A | 5/1999 | Fairholm et al. |
| 5,920,818 | A | 7/1999 | Frodigh et al. |
| 7,406,056 | B2 | 7/2008 | Warich et al. |
| 2003/0036354 | A1 | 2/2003 | Lee et al. |
| 2003/0118128 | A1 | 6/2003 | Liang |
| 2004/0125762 | A1 | 7/2004 | Haller et al. |
| 2004/0179506 | A1 | 9/2004 | Padovani et al. |
| 2006/0205408 | A1 | 9/2006 | Nakagawa et al. |
| 2008/0188177 | A1 | 8/2008 | Tan et al. |

OTHER PUBLICATIONS

Office Action mailed Aug. 3, 2010 for U.S. Appl. No. 11/583,651, 16 pages.

Office Action mailed Mar. 29, 2010 for U.S. Appl. No. 11/583,651, 18 pages.

Office Action mailed Mar. 11, 2009 for U.S. Appl. No. 11/583,651, 50 pages.

Office Action dated Sep. 22, 2011 for Japanese Patent Application No. 2006-285336 with English translation, 5 pages.

Yin, Ying-Dar, et al., Multihop Cellular: A New Architecture for Wireless Communications, IEEE INFOCOM 2000, pp. 1273-1282.

Wu, Hongyi, et al., "Integrated Cellular and Ad Hoc Relaying Systems: iCAR", IEEE Journal on Selected Areas in Communications, vol. 19, No. 10, Oct. 2001, pp. 2105-2115.

Cavalcanti, Dave, et al., "Issues in Integrating Cellular Networks, WLANs, and MANETs: A Futuristic Heterogeneous Wireless Network", IEEE Personal Communications, IEEE Communications Society, United States, vol. 12, No. 3, Jun. 2005, pp. 30-41.

Luo, Haiyun, et al., "UCAN: a Unified Cellular and Ad-Hoc Network Architecture", Proceedings of the 9th Annual International Conference on Mobile Computing and Networking, MOBICOM 2003, San Diego, California, Sep. 14-19, 2003, pp. 353-367.

Negi, Ansuya, et al., "Power Saving Approaches in 2-hop Relaying Cellular Networks", Personal, Indoor, and Mobile Radio Communications, 2005, PIMRC 2005, IEEE 16th International Symposium in Berlin, Germany, Sep. 11-14, 2005, pp. 1616-1620.

Wei, Hung-Yu, et al., "Two-Hop-Relay Architecture for Next-Generation WWAN/WLAN Integration", IEEE Wireless Communications, Piscataway, New Jersey, vol. 11, No. 2, Apr. 2004, pp. 24-30.

Wei, Hung-Yu, et al., "WWAN/WLAN Two-Hop-Relay Architecture for Capacity Enhancement", Wireless Communications and Networking Conference, Atlanta, Georgia, Mar. 21-25, 2004, pp. 225-230.

European Search Report dated Jan. 30, 2008 for European Patent Application No. 06 021 767.6, 12 pages.

Office Action mailed Sep. 26, 2011 for U.S. Appl. No. 11/583,651, 21 pages.

Office Action mailed Nov. 5, 2010 for U.S. Appl. No. 11/583,651, 17 pages.

Office Action mailed Oct. 14, 2009 for U.S. Appl. No. 11/583,651, 13 pages.

Office Action mailed Jan. 4, 2012 for U.S. Appl. No. 12/563,865, 31 pages.

METHOD FOR ACCESSING HYBRID NETWORK, AND GATEWAY APPARATUS, WIRELESS TERMINAL AND COMMUNICATION SYSTEM THEREOF

PRIORITY

This is a divisional application of U.S. Ser. No. 12/563,865, filed Sep. 21, 2009 now U.S. Pat. No. 8,311,022, which is a divisional of U.S. Ser. No. 11/583,651, filed Oct. 18, 2006 now U.S. Pat. No. 8,160,048, which claims priority to and incorporates by reference the entire contents of Chinese priority document 200510109212.4, filed in China on Oct. 19, 2005.

BACKGROUND OF THE INVENTION

1. Field of the Invention

The present invention relates to accessing to a hybrid network, and more particularly, to a method for accessing multiple networks of a hybrid network with reduced power consumption, which reduces the time consumption of a gateway node in the idle state for simultaneously sensing two networks while ensuring different network signals from the hybrid network are simultaneously received, so that power consumption per unit time of the gateway node is reduced, and the standby or serving time of the gateway node is increased, and gateway apparatus, wireless terminal and communication system thereof.

2. Description of the Prior Art

With the popularity of wireless portable terminals and the development of communication services in various fields, the future mobile communication system is required to perform communication in a "ubiquitous" manner, that is, an effective wireless transmission should be ensured anytime and anywhere. However, in the conventional cellular network, the communications between mobile terminals must be transferred by aid of base stations and (or) mobile switches, which makes the communication manner be limited by various factors such as geographical regions. For this, the wireless distributed network independent from fixed network infrastructure is proposed as a flexible wireless access manner, is considered as a supplement to and as a development of the fixed networks, and thus makes the "ubiquitous" communication manner possible. In such an extended network environment, research about communication techniques will not be limited only to any individual network, and the coexistence between the hybrid networks and the access methods of the wireless terminal in the hybrid network also become one of the most concerned subjects.

The appearance of the wireless distributed networks, such as Wireless Local Area Network (WLAN), Ad hoc and Bluetooth, makes the constitution of a hybrid network more flexible. On the basis of the architecture of a wide area cellular network, these distributed networks provide broader network coverage, increase the system capacity, and especially solve the wireless communication problems by supporting direct communications among nodes in some scenarios, such as the hotspot areas with heavy communication loads, blind-spot areas in which a central controller of the wide area cellular network cannot be directly reached, and a case where a wireless terminal has insufficient power to maintain a long-distance communication. However, since different networks employ different communication protocols, the conventional wireless terminal or node can only support transmissions in one network. For this, how to support simultaneous communication with multiple networks in the hybrid network without influences on the transmission performance of each network is a problem to be solved when extending the medium access method to the hybrid networks.

The most direct method for accessing multiple networks of a hybrid network is to employ a dual-mode wireless terminal. The dual-mode wireless terminal has a function of supporting two communication protocols, which can flexibly select a network to be accessed according to network conditions. For example, Reference 1 (CN 1604686, *Apparatus and Method for Selecting Access Network in Hybrid System*, Sep. 27, 2004, Samsung Electronics Co., Ltd.) proposes that a wireless terminal determines the network to be connected according to a predetermined priority list, and when that network fails to be connected, attempts to access a network with a next lower priority.

Similarly, Reference 2 (GB 2269723) proposes a mobile wireless phone supporting both cellular and local cordless system. Firstly, a call is routed to the cordless phone through the cordless network. Only when the position of the mobile phone cannot be determined, the cellular and the cordless system are then connected through the cellular network. Although the wireless terminals in the above systems support transmissions in more than one network, they only maintain the connection with one network at any time and thus cannot receive signals from another network. For example, in Reference 1, once the terminal can successfully access to the network with the highest priority, it will maintain the connection with the network without considering signals from other networks, so that calls from other networks cannot reach the wireless terminal. Therefore, a true dual-mode wireless terminal needs to have a capability of simultaneously receiving signals from two networks. Reference 3 (http://china.nikkeibp.co.jp/china/news/tel/tel200407190109.html) discloses that FOMA/WLAN N900iL manufactured by NEC Corporation of Japan can support a wireless terminal simultaneously operating on hybrid networks. The user may switch the operation mode among single FOMA network, single wireless local area network and dual-mode. As shown in FIG. 1, FOMA provides wide area coverage based on WCDMA technology. WLAN fulfills requirements of hotspot areas or high-speed transmissions through an Access Point (AP). The wireless terminal may simultaneously receive signals from two networks by operating in a dual-mode. However, since the terminal in the dual-mode needs to detect signals of two networks simultaneously, it requires large power consumption and thus the standby time of the terminal is shortened. For example, N900iL may standby 280 hours when operating in single FOMA network, and may standby up to 230 hours in single wireless local area network. If the dual-mode is enabled, the standby time is only 150 hours. Therefore, it is necessary to reduce the power consumption of the terminal as much as possible in order to extend the serving time while ensuring successful signals reception from two networks.

Though the dual-mode wireless terminal may support communication with multiple networks, there are a number of conventional nodes only supporting one communication protocol in the hybrid network. Considering backward compatibility, how to make these single-mode nodes be better served is also a problem to be solved by the medium access control. Relay is a common access manner, that is, a dual-mode terminal is used as a relay node. When some conventional single-mode nodes cannot be connected to the systems in which they have registered, the communication may be achieved by first connecting to a surrounding dual-mode terminal and then being forwarded by the dual-mode terminal to another network. In this way, some nodes that would not perform communication initially can obtain a better quality of service and the flexibility of network extension is enhanced by the dual-mode terminal. Reference 4 (H. Wu, C. Qiao, S. De, and O. Tonguz, *Integrated cellular and ad hoc relaying systems: iCAR*, IEEE Journal on Selected Areas in Communications, vol. 19, No. 10, October 2001) proposes that the congestion problem of the wide area cellular network can be solved by using Ad hoc Relaying Stations (ARS). When resources in a cell are not enough to admit more calls, the calls may be transferred to adjacent cells through the surrounding ARS in order to mitigate the system congestion due to imbalanced service distribution. However, this method requires the establishment of the special ARS in the system which brings a large system overhead and influences on the system flexibility. Reference 5 (Y. D. Yin, and Y. C. Hsu, *Multihop Cellular: A New Architecture for Wireless Communications*, IEEE INFOCOM, 2000) proposes that when the source and the destination nodes are located in one cell, the system capacity is improved by a method in which the communication is achieved by multiple relay connections between nodes in the cell. However, these methods all assume that all nodes in the system have the capability of supporting communications in two networks, and thus cannot support the conventional single-mode terminal in the hybrid systems, and the power consumption problem of the nodes in the system is not considered. Therefore, the present invention relates to a hybrid network which may connect with a wide area cellular network through a relay node (a gateway node), which while ensuring network connectivity as much as possible, reduces power consumption of the relay node in idle state due to simultaneously sensing signals from two networks, in order to increase the standby or serving time thereof.

SUMMARY OF THE INVENTION

A method for accessing a hybrid network, and a gateway apparatus, a wireless terminal and a communication system thereof is described. In one embodiment, a method for accessing a hybrid network including a wide area network and a distributed network, comprises sensing, by a gateway apparatus, a relay request slot on a downlink common control channel of the wide area network; transmitting, by a wireless terminal, a relay request signal requesting to relay a data packet to be transmitted, in the relay request slot on the downlink common control channel; and establishing, by the gateway apparatus, a connection with the wireless terminal in the distributed network environment, if the relay request signal from the wireless terminal is sensed in the relay request slot.

BRIEF DESCRIPTION OF THE DRAWINGS

The present invention will be more clearly understood from the description of preferred embodiments as set forth below, with reference to the accompanying drawings, wherein:

FIG. 4(*b*) is a block diagram of the wireless terminal having transmission capability in the distributed network according to the first embodiment of the present invention;

FIG. 15(*b*) is a block diagram of the wireless terminal only supporting transmissions in the distributed network in the hybrid network according to the second embodiment of the present invention;

DETAILED DESCRIPTION OF THE PREFERRED EMBODIMENTS

Figure 1:
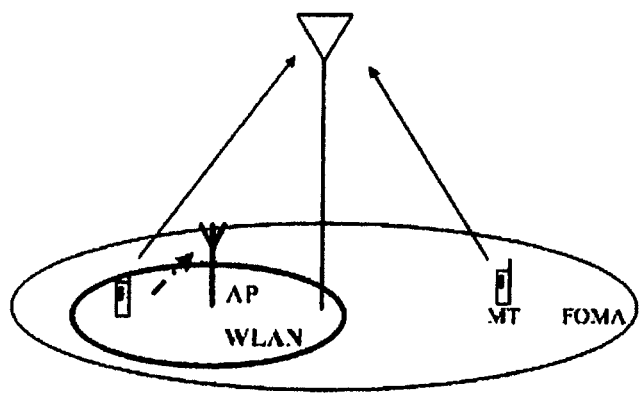
FIG. 1 shows a schematic diagram of an existing FOMA/WLAN dual-mode terminal in a hybrid network.

In another embodiment of the present invention, a wireless terminal that performs communication through a relay of a gateway apparatus in a hybrid network including a wide area network and a distributed network, comprises: a distributed network transceiving means for transmitting and receiving signals in the distributed network; a downlink common control channel transceiving means for transmitting a relay request signal requesting to relay a data packet to be transmitted and receiving signals on a downlink common control channel of the wide area network; a detection means for detecting the signals received by the downlink common control channel transceiving means on the downlink common control channel, and detecting the type of current slot on the downlink common control channel; and an access determination means for receiving information from the detection means and determining a network to be accessed currently.

Thus, a dedicated slot on the downlink common control channel (DCCCH) of the wide area network is allocated for carrying information from the wireless distributed network, so that the gateway apparatus or the dual-mode wireless terminal functioning as a gateway apparatus can obtain transmission requests in both networks as long as the downlink common control channel from the wide area cellular network is sensed in an idle standby state, and enables the operation mode thereof when there is a transmission request in the wireless distributed network, so that unnecessary power consumption is saved and the serving time of the gateway apparatus is increased.

In another embodiment of the present invention, a method for accessing a hybrid network including a wide area network and a distributed network, comprises: regularly transmitting by a base station of the wide area network a synchronization signaling for synchronizing with a downlink common control channel, on a transmission frequency band of the wireless distributed network; transmitting by a wireless terminal a relay request signal requesting to relay a data packet to be transmitted, after receiving the synchronization signaling; starting by a gateway apparatus to access the distributed network to receive the relay request signal from the wireless terminal at a time instant corresponding to the synchronization signaling sensed on the downlink common control channel; and establishing by the gateway apparatus a connection with the wireless terminal in the distributed network environment.

In another embodiment of the present invention, a gateway apparatus for accessing a hybrid network including a wide area network and a distributed network, comprises: a wide area network transceiving means for transmitting and receiving signals in the wide area network; a distributed network transceiving means for transmitting and receiving signals in the distributed network; a timer means for detecting whether current time is an integer multiple of a periodic time, and periodically enabling a sensing unit to sense a channel of the distributed network; and a sensing means for sensing the channel of the distributed network at the enabling time instant instructed by the timer means.

In another embodiment of the present invention, a wireless terminal which performs communication through a relay of a gateway apparatus in a hybrid network including a wide area network and a distributed network, comprises: a distributed network transceiving means for transmitting and receiving signals in the distributed network; a transmission control means for controlling transmission and reception of signals in the distributed network, and clocking; and a delay means for receiving an instruction from the transmission control means and delaying.

Thus, a synchronization signaling for synchronizing with the downlink common control channel is regularly transmitted on the transmission frequency band of the wireless distributed network by the base station of the wide area network. After receiving the synchronization signaling, the wireless terminal transmits the relay request signal, and the gateway apparatus may enable the access to the distributed network corresponding to the synchronization signaling in order to receive the relay request signal from the wireless terminal. Therefore, the gateway apparatus only senses the distributed network intermittently, and thus the power consumption is reduced, and the serving time of the gateway node is increased.

Hereafter, the implementation of the present invention will be described in detail by the embodiments referring to the drawings.

Considering the above problems, embodiments of the present invention include a method and an apparatus for accessing multiple networks of a hybrid network with reduced power consumption.

In an embodiment of the present invention, a method for accessing a hybrid network including a wide area network and a distributed network, comprises: sensing, by a gateway apparatus, a relay request slot on a downlink common control channel of the wide area network; transmitting, by a wireless terminal, a relay request signal requesting to relay a data packet to be transmitted, in the relay request slot on the downlink common control channel; and if the relay request signal from the wireless terminal is sensed in the relay request slot, establishing, by the gateway apparatus, a connection with the wireless terminal in the distributed network environment.

In another embodiment of the present invention, a gateway apparatus for accessing a hybrid network including a wide area network and a distributed network, comprises: a wide area network transceiving means for transmitting and receiving signals in the wide area network; a distributed network transceiving means for transmitting and receiving signals in the distributed network; a detection means for detecting the signals received by the wide area network transceiver means on a downlink common control channel of the wide area network, and detecting the type of current slot on the downlink common control channel; and an access determination means for receiving results of the detection from the detection means and determining a network to be accessed currently.

The First Embodiment

Figure 2:
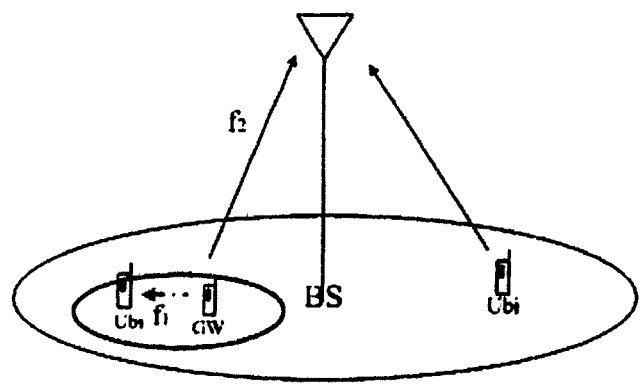
FIG. 2 shows a schematic diagram of the structure of the hybrid network formed by a wide area cellular network and a wireless distributed network related with the present invention.

FIG. 2 shows a schematic diagram of the structure of the hybrid network formed by a wide area cellular network and a wireless distributed network related with the present invention. In FIG. 2, reference sign BS denotes a base station in the wide area cellular network, the coverage of which is shown as the bigger ellipse, and the base station communicates with a terminal Ubi or gateway GW within its coverage at a frequency band f2. The smaller ellipse shown in FIG. 2 denotes the coverage of the wireless distributed network which can be various networks such as Wireless Local Area Network (WLAN), ad hoc, or Bluetooth. This network operates at another frequency band f1 which is not equal to the frequency band f2, so there is no interference between the wireless distributed network and the wide area cellular network. Reference sign GW denotes a gateway node which is a dual-mode wireless terminal having the capability of supporting simultaneous communication in two networks and can successfully connect with any one of the networks in order to provide relaying services for the surrounding nodes. Reference sign Ubi denotes a wireless terminal which cannot perform a communication of ensured Quality of Service (QoS) with a central control unit of the wide area cellular network and can be either a dual-mode terminal having the same functionality as gateway GW but not able to communicate with the base station (for example, located in a blind-spot area or with an insufficient power) or a single-mode terminal only with enhanced functionality, that is to say, only with a functionality of supporting transmissions in the wireless distributed network and transmitting and receiving signals on a downlink common control channel of the wide area cellular network. In one embodiment of the present invention, it is assumed that all the terminals including gateway GW and wireless terminal Ubi in the hybrid network can receive data from the downlink common control channel of the wide area cellular network (for example, for WCDMA network, the downlink common control channel refers to the Broadcast CHannel (BCH)). When any terminal has a transmission request, the wide area cellular network is selected in priority for transmission, and when the wide area cellular network cannot guarantee the quality of service of the transmission thereof, the transmission will be relayed to the wide area cellular network through the surrounding gateway nodes by using the wireless distributed network.

Figure 3:
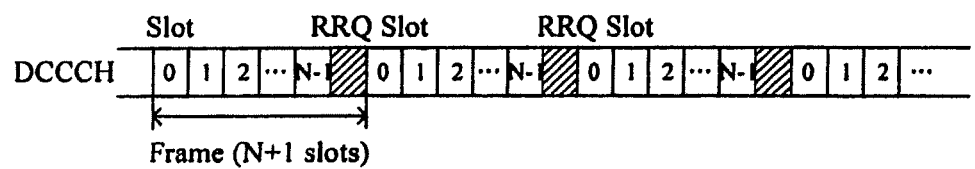
FIG. 3 is a schematic diagram of the downlink common control channel of a wide area cellular network according to the first embodiment of the present invention.

FIG. 3 is a schematic diagram of the Downlink Common Control CHannel (DCCCH) of the wide area cellular network according the first embodiment of the present invention. As shown in FIG. 3, the downlink common control channel DCCCH is divided into a plurality of time units a in time axis, which are called as slots, and sequential N+1 slots form a frame. The first N slots of each frame is used for transmitting common control information of the base station BS, such as broadcast information, paging messages, synchronization and pilot information and so on. The N+1th slot, in which the base station does not transmit any information, is dedicated for carrying relay transmission requests from the wireless distributed network, and is therefore called as a relay request slot.

Figure 4A:
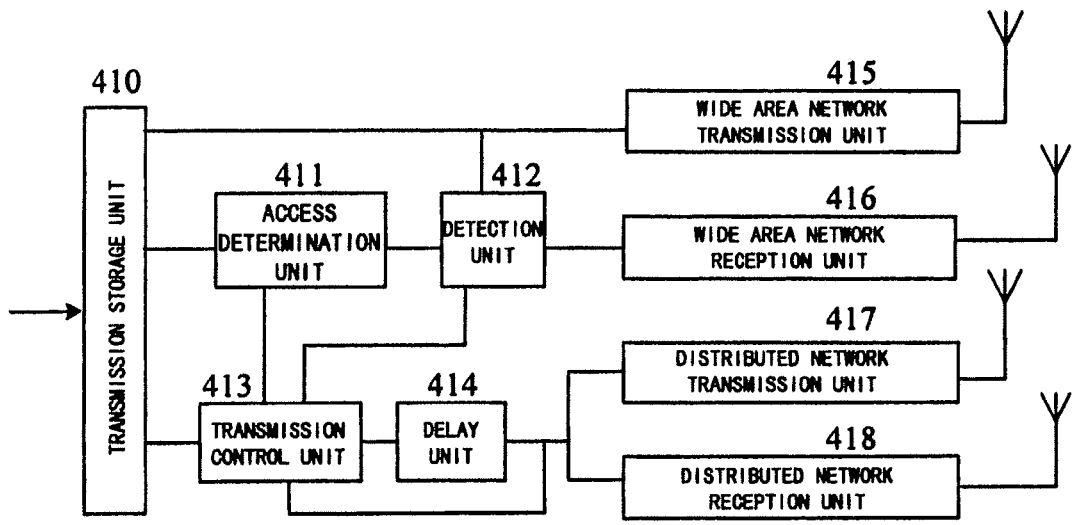
FIG. 4(*a*) is a block diagram of the gateway apparatus supporting communications in two networks in the hybrid network according to the first embodiment of the present invention.

FIG. 4 shows block diagrams of respective nodes in the hybrid network. FIG. 4(a) is a block diagram of the gateway apparatus supporting communications in two networks in the hybrid network according to the first embodiment of the present invention.

As shown in FIG. 4(a), the gateway apparatus of the present invention includes a transmission storage unit 410 for storing packets to be transmitted; a wide area network transmission unit 415 for transmitting signals in the wide area network; a wide area reception unit 416 for receiving signals from the wide area network; a distributed network transmission unit 417 for transmitting signals in the distributed network; a distributed network reception unit 418 for receiving signals from the distributed network, a detection unit 412 for detecting signals received by the wide area reception unit 416 on the downlink common control channel, and detecting the type of current slot on the downlink common control channel, that is, whether it is a relay request slot or not; an access determination unit 411 for receiving result of the detection from the detection unit 412, and determining a network to be accessed currently; a transmission control unit 413 for receiving results from the access determination unit 411 and the detection unit 412, and controlling the transmission and reception of signals in the distributed network; and a delay unit 414 for receiving an instruction from the transmission control unit 413 and delaying.

When there is a packet to be transmitted in the transmission storage unit 410 of the gateway apparatus, the access determination unit 411 directs access between the gateway apparatus and the wide area network and performs traffic transmission in the wide area network through the wide area network transmission unit 415. When the detection unit 412 detects that a signaling is transmitted on the current relay request slot, the access determination unit 411 instructs to access the gateway apparatus to the distributed network and enables the transmission control unit 413.

When the access determination unit 411 directs access to the distributed network, the transmission control unit 413 starts the delay unit 414 to perform a back-off operation, and after a certain period of back-off, transmits a reply packet RPL through the distributed network transmission unit 417. After accessing to the distributed network, when signals received by the distributed network reception unit 418 indicates that a selection packet SLT directed to the present gateway apparatus is received, the transmission control unit 413 instructs the distributed network transmission unit 417 to transmit a permit packet PMT. When signals received by the distributed network reception unit 418 indicate that a data packet is received, the transmission control unit 413 instructs the distributed network transmission unit 417 to transmit an acknowledgement packet ACK. After the transmission of the acknowledgement packet is completed, the access determination unit 411 directs to access to the wide area network and transmits to the base station BS the data packet received from the wireless distributed network.

Figure 4B:
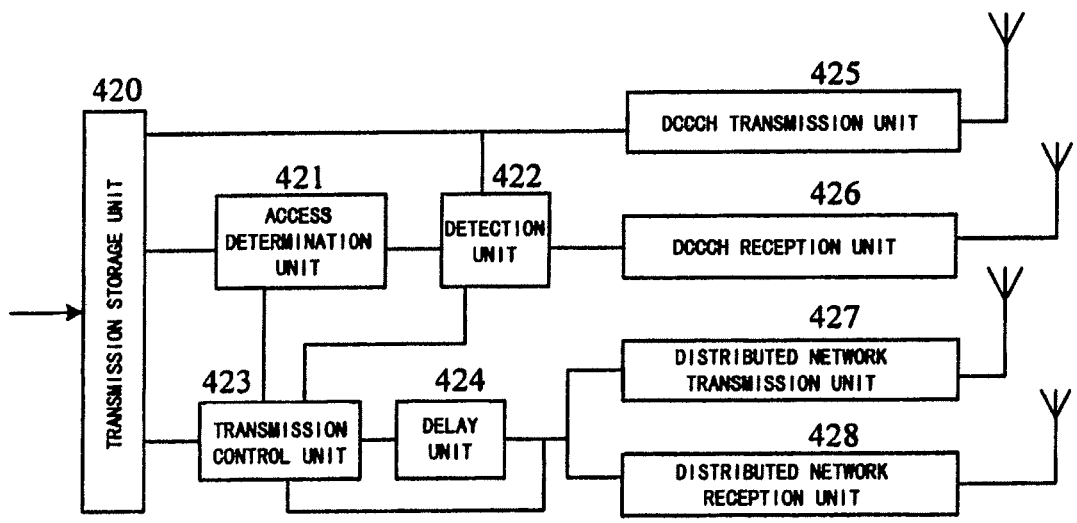

FIG. 4(b) is a block diagram of the wireless terminal having transmission capability in the distributed network according to the first embodiment of the present invention. As shown in FIG. 4(b), the wireless terminal of the present embodiment includes a transmission storage unit 420 for storing packets to be transmitted; a distributed network transmission unit 427 for transmitting signals in the distributed network; a distributed network reception unit 428 for receiving signals from the distributed network; a DCCCH transmission unit 425 for transmitting a relay request signal on the downlink common control channel of the wide area network; a DCCCH reception unit 426 for receiving signals from the downlink common control channel of the wide area network; a detection unit 422 for detecting the signals received by the DCCCH reception unit 426 on the downlink common control channel, and detecting current slot type on the downlink common control channel, that is, whether it is a relay request slot or not; an access determination unit 421 for receiving signals from the detection unit 422, and determining a network to be accessed currently; a transmission control unit 423 for receiving results from the access determination unit 421 and the detection unit 422, controlling the transmission and reception of signals in the distributed network, and clocking; and a delay unit 424 for receiving an instruction from the transmission control unit 423 and delaying.

When there is a packet to be transmitted in the transmission storage unit 420 of the wireless terminal, the access determination unit 421 directs to access to the DCCCH channel, and transmits a relay request signal through the DCCCH transmission unit 425 on the relay request slot detected by the detection unit 422. After the transmission of the relay request signal is completed, the access determination unit 421 directs to access to the distributed network and enables the transmission control unit 423.

When the access determination unit 421 directs to access to the distributed network, the transmission control unit 423 starts clocking, and receives signals through the distributed network reception unit 428 within a reception threshold time. When the reception threshold time is reached, if a reply packet RPL is correctly received, the received signal is analyzed, and the distributed network transmission unit 427 is instructed to transmit a selection packet SLT. If no packet is received, then the delay unit 424 is enabled. When the distributed network reception unit 428 receives a permit packet PMT, a data packet is transmitted. Further, when the distributed network reception unit 428 successfully receives an acknowledgement packet ACK, the access determination unit 421 is instructed to stop the access to the distributed network.

Additionally, the gateway apparatus capable of supporting communications in two networks may also be used as a wireless terminal Ubi, for example, in a case where the measured DCCCH signals indicates that current channel conditions cannot fulfill the QoS requirements of the transmission thereof or this node cannot directly communicate with the base station BS. In this case, the block diagram of the gateway apparatus is same as FIG. 4(*b*), expect for that it is provided with the wide area network transmission unit 415 and the wide area reception unit 416 which will not function now.

Figure 5:
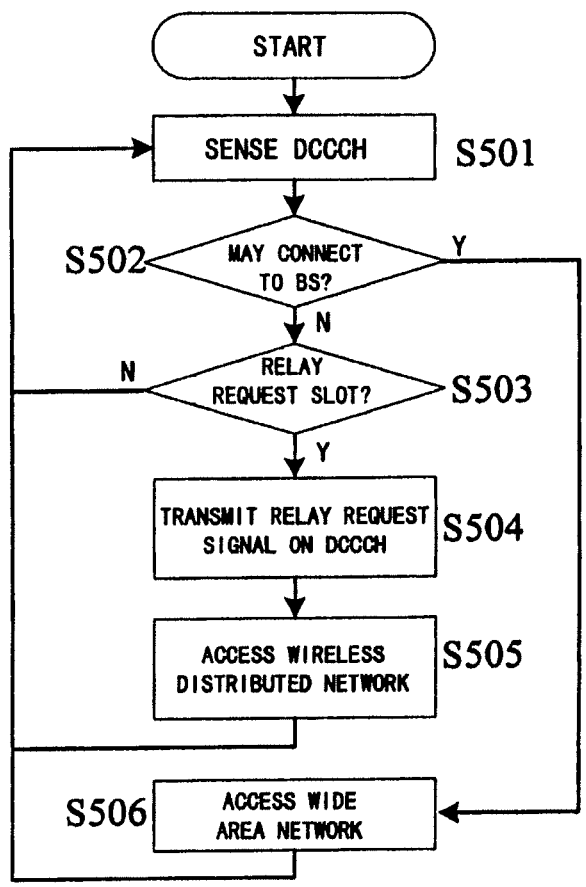
FIG. 5 is a schematic diagram for accessing when the wireless terminal has a transmission request in the hybrid network of the present invention.

FIG. 5 is a schematic diagram for accessing when the wireless terminal has a transmission request in the hybrid network of the present invention. At step S501, the wireless terminal in the hybrid network is in an idle state and only senses the downlink common control channel (DCCCH) from the wide area network through the DCCCH reception unit 426. At step S502, when the wireless terminal has a transmission request, it will be determined whether it can perform traffic transmission directly with the base station BS or not according to its node functionality and the sensed channel conditions of the DCCCH.

If it can directly connect with and communicate with the base station BS, then the wireless terminal may be used as a gateway (GW) node. At step S506, the wireless terminal is directly accessed to the wide area network to perform traffic transmissions. If the wireless terminal cannot establish a direct connection with the base station BS and communicate therewith, then it indicates that the wireless terminal is a Ubi node (a wireless terminal only used for communication). Thereafter, at step S503, the detection unit 422 detects whether the slot on the DCCCH is a Relay Request slot (RRq slot) or not.

If the slot is a relay request slot, then at step S504, a Relay Request signal (RRq signal) is transmitted on the relay request slot by the DCCCH transmission unit 425. Thereafter, at step S505, the access determination unit 421 directs to access the wireless terminal to the wireless distributed network for preparing for traffic transmission. On the contrary, if the slot is not a relay request slot, then the flow proceeds to step S501, the downlink common control channel is subsequently sensed.

Figure 6:
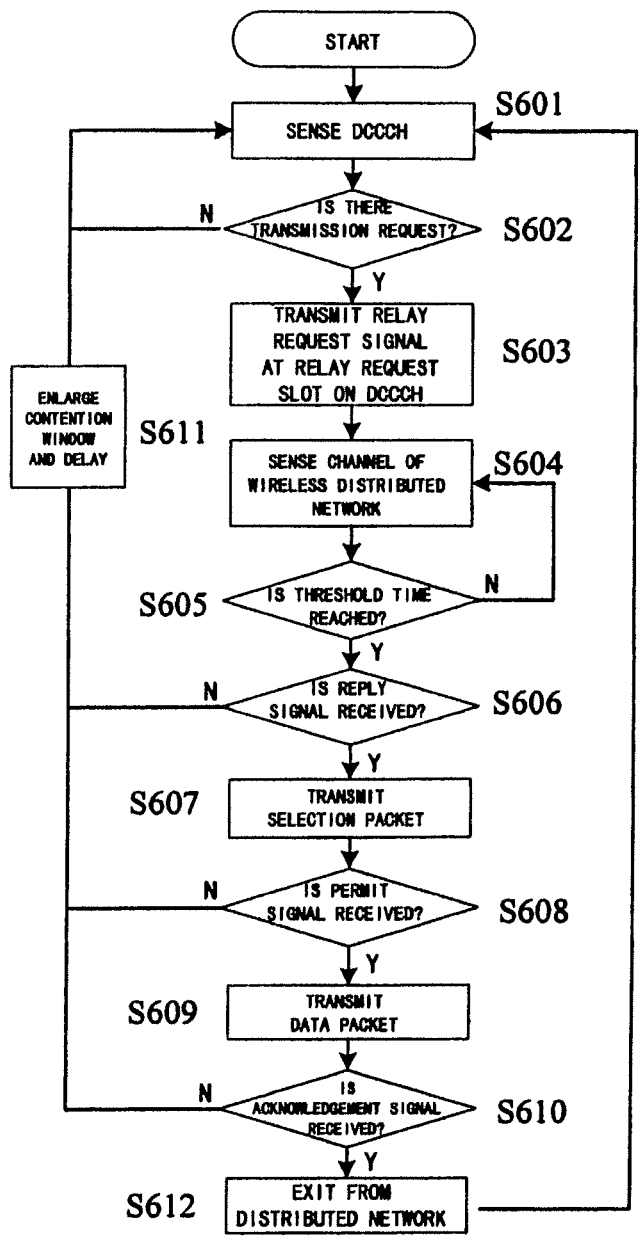
FIG. 6 is a detail flowchart of operation on the wireless terminal side in a case where the gateway apparatus performs a point-to-point transmission with the wireless terminal in the hybrid network according to the first embodiment of the present invention.

FIG. 6 is a detail flowchart of operation on the wireless terminal side in a case where the gateway apparatus performs a point-to-point transmission with the wireless terminal in the hybrid network according to the first embodiment of the present invention. At step S601, the wireless terminal (Ubi node) in the hybrid network senses the DCCCH channel all the time. At step S602, it is determined whether transmission request signal is sensed. At step S603, when the wireless terminal Ubi has a transmission request, a relay request signal is transmitted on the relay request slot of the downlink common control channel, and when the transmission is completed, the distributed network transmission unit 427 and the distributed network reception unit 428 for the wireless distributed network are enabled to sense a wireless distributed network channel, that is, step S604.

At step S605, if the sensing period has reached the threshold time, then at step S606, it is detected whether a reply packet RPL is received within this period. If it is not received, then at step S611, the contention window is enlarged, and after delaying a certain period, the DCCCH is subsequently sensed and the relay request signal is retransmitted. If the reply packet RPL is received, then at step S607, one relay node (gateway apparatus) is selected from multiple reply packets RPL, and a selection packet SLT is transmitted thereto. After the transmission of the selection packet SLT is completed, it is determined at step S608 whether a permit packet PMT is received or not. If the permit packet PMT is received, then at step S609, a data packet is transmitted, and then at step S610, it is determined whether an acknowledgement packet ACK is received or not. After the acknowledgement packet ACK is received, the transmission is terminated, and at step S612, it exits from the distributed network. Otherwise, at step S611, the contention window is enlarged, and after delaying a certain period, the relay request is retransmitted.

Figure 7:
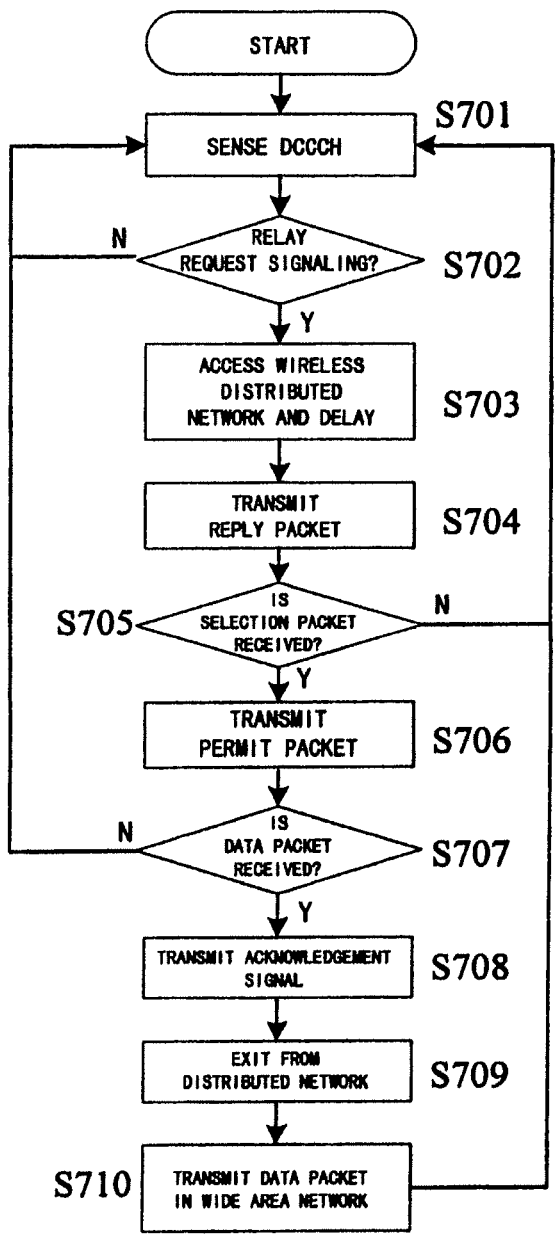
FIG. 7 is a detail flowchart of the relaying operation on the gateway apparatus side in a case where the gateway apparatus performs a point-to-point transmission with the wireless terminal in the hybrid network according to the first embodiment of the present invention.

FIG. 7 is a detail flowchart of the relaying operation on the gateway apparatus side in a case where the gateway apparatus performs a point-to-point transmission with the wireless terminal in the hybrid network according to the first embodiment of the present invention. As shown in FIG. 7, at step S701, the gateway apparatus in the hybrid network senses the DCCCH channel all the time. At step S702, it is determined whether the detection unit 412 detects a relay request signal or not. When the detection unit 412 detects that there is a relay request signal in the relay request slot on the DCCCH channel, at step S703, the delay unit 414 delays a random period. Thereafter, at step S704, the wireless distributed network transmission unit 417 is enabled to transmit a reply packet RPL.

If the transmission of the replay packet RPL is completed, at step S705, it is determined whether a selection packet SLT is received from the surrounding wireless terminals. At step S706, if a selection packet SLT directed to the gateway apparatus is received, then at step S706, a permit packet PMT is transmitted. On the contrary, it exits from the distributed network and only senses the DCCCH channel. After the transmission of the permit packet PMT is completed, at step S707, it is determined whether a data packet is received. If the data packet is successfully received, then at step S708, an acknowledgement packet ACK is transmitted, and thereafter it exits from the distributed network at step S709, and at step S710, begins to access the transmission channel in the wide area network to transmit the data packet.

Figure 8:
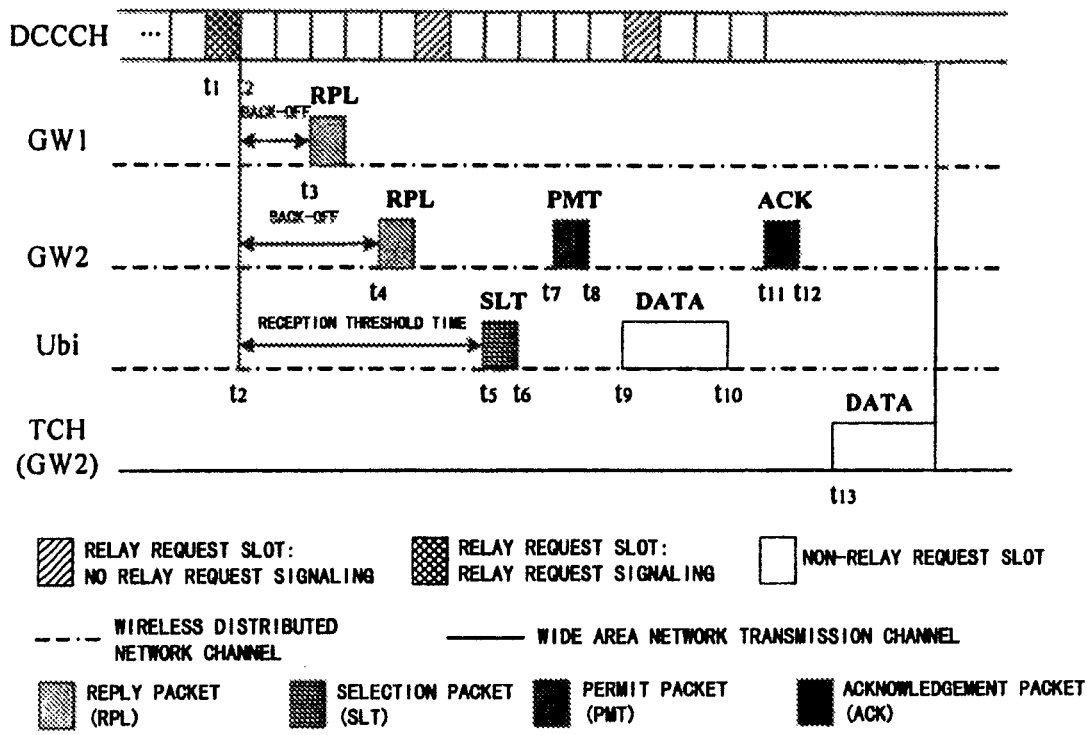
FIG. 8 is a timing diagram of respective nodes in a case where the wireless terminal successfully establishes a point-to-point connection with the gateway apparatus and then transmits data according to the first embodiment of the present invention.

FIG. 8 is a timing diagram of respective nodes in a case where the wireless terminal successfully establishes a point-to-point connection with the gateway apparatus and then transmits data, and the gateway apparatus relays the packets to the wide area network according to the first embodiment of the present invention.

The gateway apparatus GW1 and the gateway apparatus GW2 sense the downlink common control channel of the wide area network all the time. When the wireless terminal Ubi has a request for transmitting data packets through the gateway apparatus, it transmits the relay request signal on the relay request slot of the DCCCH at the time instant $t_1$, through the DCCCH transmission unit 425.

At the time instant $t_2$, the wireless terminal Ubi finishes the transmission and enables the wireless distributed network transmission unit 427 and the distributed network reception unit 428 for preparing for the reception of signals, and clocks by the transmission control unit 423. The gateway apparatuses GW1 and GW2 which are around the wireless terminal Ubi and detect the relay request signal on the DCCCH enter into the back-off procedures at the time instant $t_2$, delay a random period, and at the time instants $t_3$ and $t_4$ after the delaying, enables the wireless distributed network transmission unit 417 and the distributed network reception unit 418 to transmit the reply packet RPL.

When the transmission control unit 423 indicates that the reception threshold time is reached, that is, at the time instant $t_5$, the wireless terminal Ubi detects whether the reply packet RPL is received or not by the detection unit 422. Information of channels between the current gateway apparatus to the base station BS and the wireless terminal is contained in the reply packet RPL. Thereafter, the conditions of channels with the BS indicated in the received reply packets RPL are compared, and the gateway apparatus GW2 which has the best condition of channel with the BS and needs the lowest transmission power for the direct communication with the BS is selected as the relay apparatus of the wireless terminal Ubi. Thereafter, at the time instant $t_5$, the selection packet SLT that contains an address of the selected gateway apparatus, for example an address of the gateway apparatus GW2, is transmitted by the wireless distributed network transmission unit 427. For example, the wireless terminal Ubi selects the gateway apparatus with the largest signal to interference and noise ratio (SINR) or the nearest distance according to power measurements in order to determine the most appropriate relay gateway.

At the time instant $t_6$, when the gateway apparatus GW1 receives the selection packet SLT from the wireless terminal Ubi, it detects that the packet is not a packet directed thereto and thus turns off the distributed network transmission unit 417 and the distributed network reception unit 418 and enters into the idle state. The gateway apparatus GW2 receives the selection packet SLT from the wireless terminal Ubi, and detects that the packet is a packet directed thereto. Then, the gateway apparatus GW2 transmits the permit packet PMT at the time instant $t_7$ by the distributed network transmission unit 417 to indicate that it is ready to receive and relay the data packet from the wireless terminal Ubi.

At the time instant $t_8$, the wireless terminal Ubi receives the permit packet PMT from the gateway apparatus GW2. At the time instant $t_9$, the wireless terminal Ubi transmits, to the gateway apparatus GW2, the data packet to be transmitted, and at the time instant $t_{10}$ after completing the transmission of the data packet, terminates the transmission.

At the time instant $t_{10}$, the gateway apparatus GW2 successfully receives the data packet from the wireless terminal Ubi. At the time instant $t_{11}$, the acknowledgement packet ACK is transmitted, and at the time instant $t_{12}$ after completing the transmission of the acknowledgement packet ACK, the distributed network transmission unit 417 and the distributed network reception unit 418 are turned to prepare for the data transmission in the wide area network.

At the time instant $t_{13}$, the gateway apparatus GW2 successfully connects to the transmission channel of the wide area network and begins to transmit the data packet received from the wireless terminal Ubi.

Figure 9:
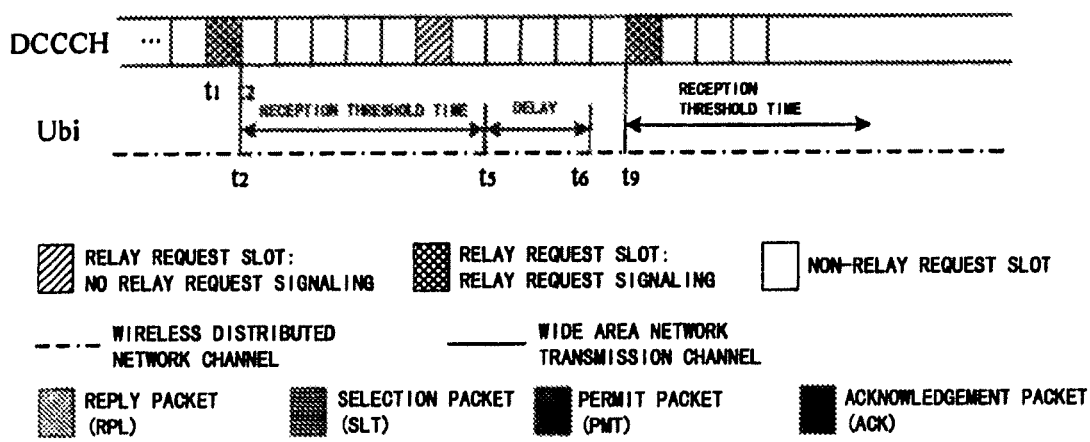
FIG. 9 is a timing diagram of respective nodes in a case where the wireless terminal performs retransmission when no reply signal is received in a reception threshold time according to the first embodiment of the present invention.

FIG. 9 is a timing diagram of respective nodes in a case where the wireless terminal performs retransmission when no reply signal is received in a reception threshold time according to the first embodiment of the present invention.

When the wireless terminal Ubi has a transmission request, it transmits the relay request signal on the relay request slot of the DCCCH at the time instant $t_1$. Thereafter, at the time instant $t_2$, the transmission is completed, and the wireless distributed network transmission unit 427 and the distributed network reception unit 428 are enabled to prepare for the signal reception and the transmission control unit 423 begins clocking. At the time instant $t_5$ at which the reception threshold time is reached, the wireless terminal Ubi detects no reply packet and then enlarges its contention window and delays a random period within the contention window.

At the time instant $t_6$, which is the end of the delayed interval the wireless terminal Ubi retransmits the relay request signal on the first relay request slot on the DCCCH detected after that time instant, that is, at the time instant $t_9$.

Figure 10:
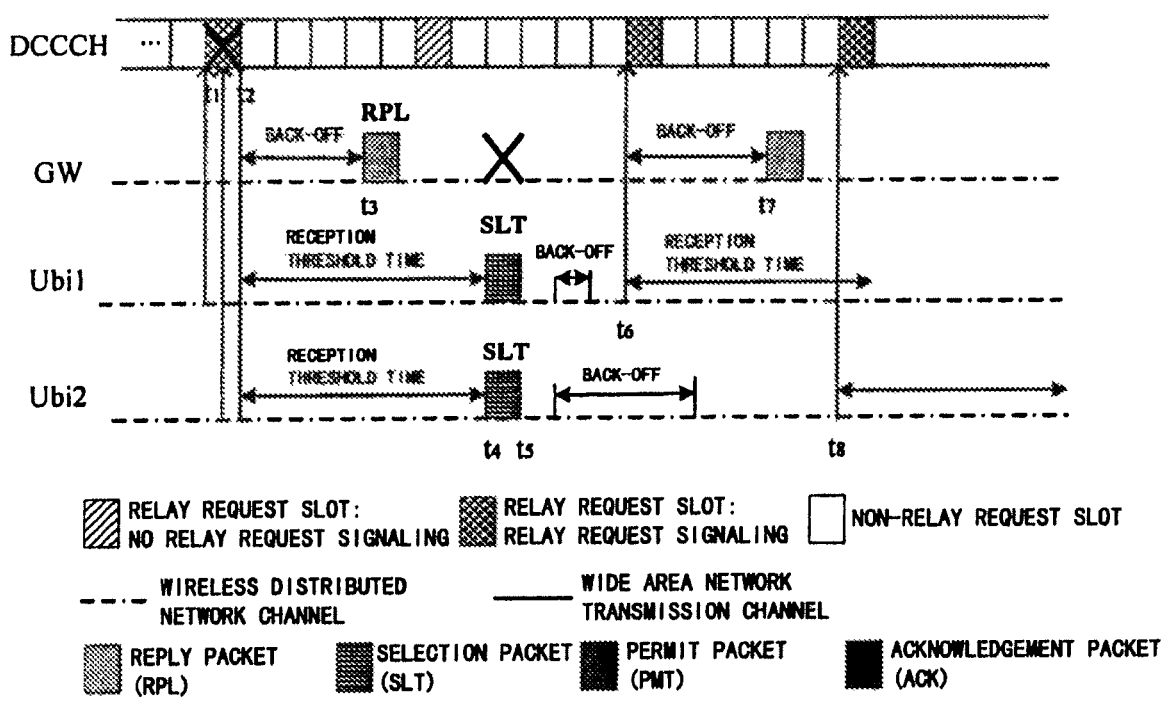
FIG. 10 is a timing diagram of respective nodes in a case where multiple wireless terminals transmit relay request signals in one and the same relay request slot according the first embodiment of the present invention.

FIG. 10 is a timing diagram of respective nodes in a case where multiple wireless terminals transmit relay request signals in one and the same relay request slot according the first embodiment of the present invention.

As shown in FIG. 10, at the time instant $t_1$, the wireless terminals Ubi1 and Ubi2 simultaneously transmit the relay request signals on the detected relay request slot of the DCCCH. The gateway apparatus GW2 senses that there is non-noise signal in the relay request slot on the DCCCH, and thus delays a certain period. Thereafter, at the time instant $t_3$ after the end of the back-off, the wireless distributed network transmission unit 417 and the distributed network reception unit 418 are enabled to transmit the reply packet RPL.

The wireless terminals Ubi1 and Ubi2 only receive the reply packet RPL from the gateway apparatus GW2 within the reception threshold time, and thus select the gateway apparatus GW2 as the respective relay apparatuses, that is, at the time instant $t_4$, simultaneously transmit the selection packets SLT directed to the gateway apparatus GW2.

At the time instant $t_5$, the gateway apparatus GW2 detects the collision and thus exits from the distributed network. The wireless terminals Ubi1 and Ubi2 do not receive the permit packet PMT within a certain period after transmitting the SLT, then consider it as a transmission failure, increase the contention windows, enter into the back-off procedures, and after the end of the back-off, subsequently detect the relay request slot on the DCCCH.

The wireless terminal Ubi1 retransmits the relay request signal on the first relay request slot on the DCCCH detected after the end of the back-off procedure, that is, at the time instant $t_6$. The wireless terminal Ubi2 retransmits the relay request signal on the first relay request slot on the DCCCH detected after the end of the back-off procedure, that is, at the time instant $t_8$.

In this example, although the relay request signals from multiple wireless terminals Ubi collide on one and the same relay request slot on the DCCCH, the gateway apparatus GW2 enables the distributed network transmission unit 417 and the distributed network reception unit 418 only if the power level on this slot is detected to be larger than the noise power, and then prepares for transmitting the reply packet RPL, and thus will not influence on the reception of the relay request signals from the wireless terminals Ubi. As another example, the gateway apparatus GW2 transmits the reply signal to the surrounding wireless terminals Ubi once detecting a high level at the relay request slot.

As above discussed, according to the first embodiment of the present invention, in a hybrid network of a wide area network and a wireless distributed network, a dedicated slot on the downlink common control channel of the wide area network is allocated for carrying the relay request signals. When the wireless terminal cannot directly communicate with the base station of the wide area network, it transmits the relay request signal on the relay request slot by sensing the downlink common control channel. The gateway apparatuses which are around the wireless terminal and detect the relay request signal on the relay request slot of the downlink common control channel access to the wireless distributed network at this time to transmit the reply packets.

Therefore, by transmitting the relay request signal on the downlink common control channel, the gateway apparatus need not sense signals from two networks in the idle state, but only senses the downlink common control channel of the wide area network. If necessary, the gateway apparatus enables the wireless distributed network transmission unit and the distributed network reception unit for relay, so that the power consumption of the gateway apparatus used for unnecessarily sensing the wireless distributed network is reduced and thus the standby time of the gateway node is increased.

Although the operations performed in a case where the gateway apparatus and the wireless terminal establish a point-to-point connection according to the first embodiment of the present invention has been described, the present invention is not limited thereto. In the present invention, one gateway apparatus may simultaneously establish connections to multiple wireless terminals, that is to say, establish a point-to-multipoint connection, so that relay the data transmissions for the multiple wireless terminals in a polling manner.

Figure 11:
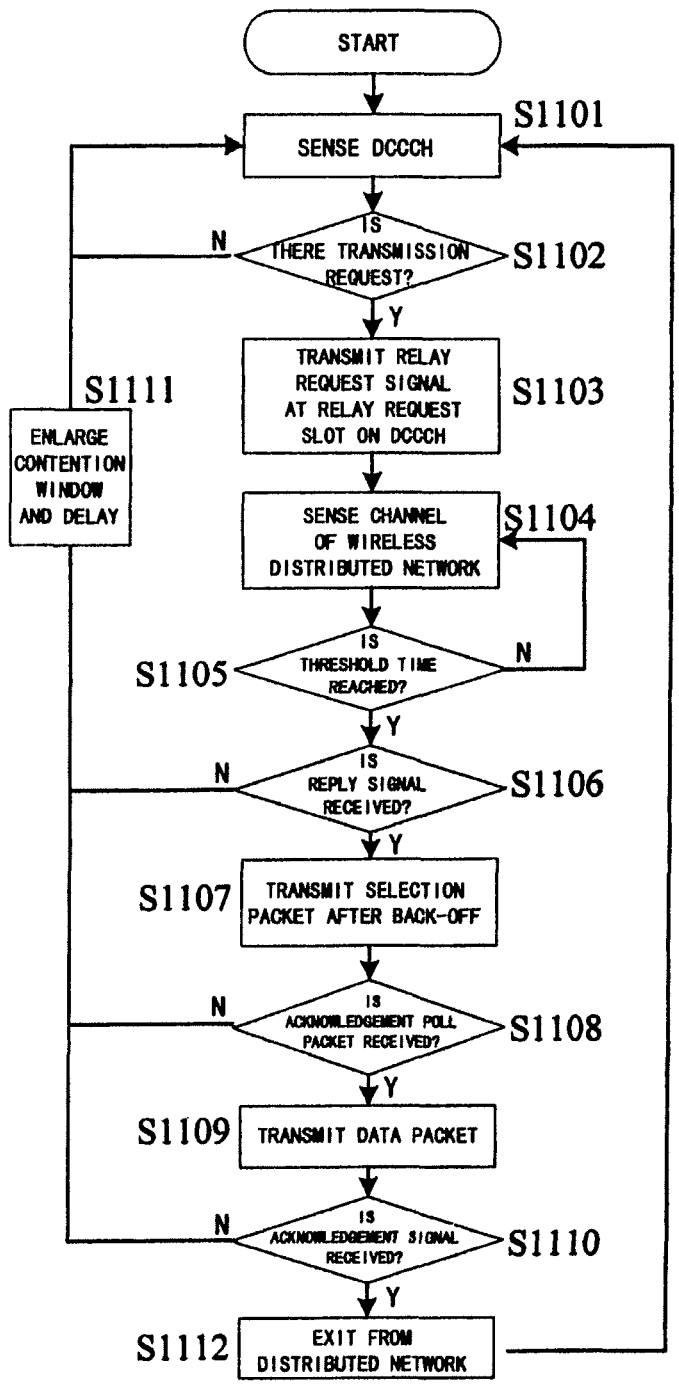
FIG. 11 is a detail flowchart of operation on the wireless terminal side in a case where the gateway apparatus performs a point-to-multipoint transmission with multiple wireless terminals in the hybrid network according to the first embodiment of the present invention.

FIG. 11 is a detail flowchart of operation on the wireless terminal side in a case where the gateway apparatus performs a point-to-multipoint transmission with multiple wireless terminals in the hybrid network according to the first embodiment of the present invention.

It should be noted that the differences between the steps of FIG. 11 and the steps of FIG. 6 start from the reception of the reply signal, the description about the preceding steps S1101-S1105 is similar to that for FIG. 6. Therefore, the repeated description about steps S1101-S1105 is omitted.

At step S1106, the wireless terminals Ubi1 and Ubi2 receive the reply packet from the gateway apparatus GW. Then, at step S1107, the wireless terminals transmit the selection packets SLT after certain periods of back-off. If the wireless terminals receive acknowledgement poll packets ACK+Poll after the threshold time, then they sequentially transmit the data packets to the gateway apparatus transmitting the poll packets at step S1109. At step S1110, if the acknowledgement packets ACK are received after transmitting the data packet, the transmission is terminated, and at step S1112, they exit from the distributed network. Otherwise, at step S1111, the contention windows are enlarged, and the relay requests are retransmitted after delaying certain periods.

Figure 12:
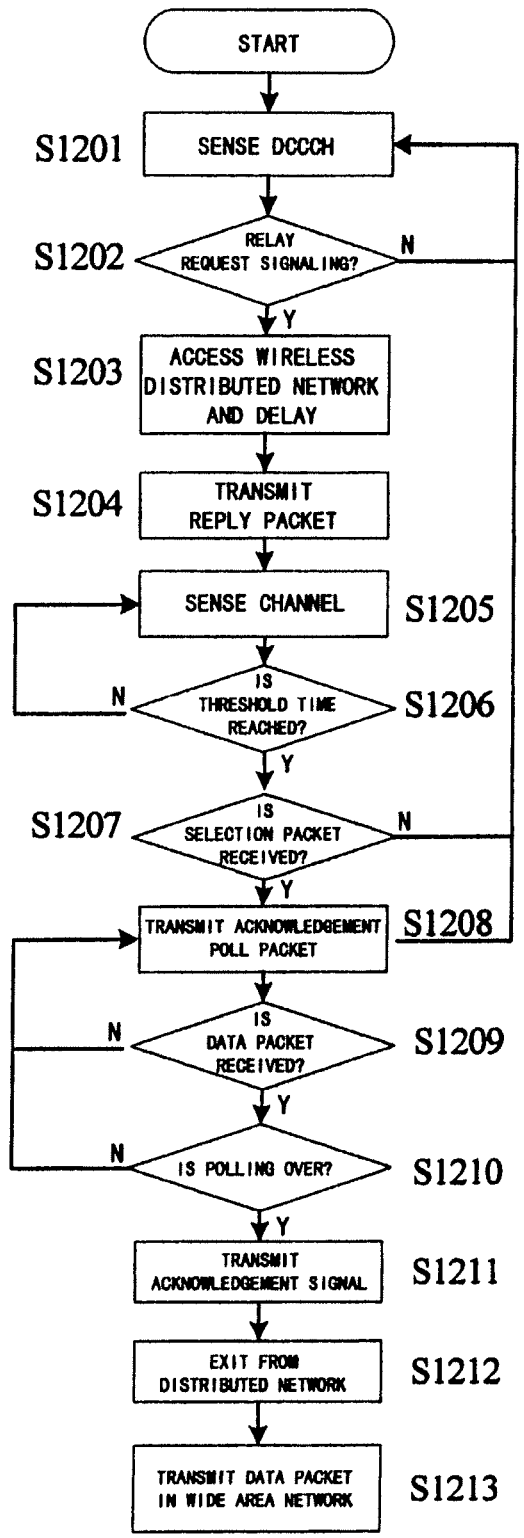
FIG. 12 is a detail flowchart of the relaying operation on the gateway apparatus side in a case where the gateway apparatus performs a point-to-multipoint transmission with multiple wireless terminals in the hybrid network according to the first embodiment of the present invention.

FIG. 12 is a detail flowchart of the relaying operation on the gateway apparatus side in a case where the gateway apparatus performs a point-to-multipoint transmission with multiple wireless terminals in the hybrid network according to the first embodiment of the present invention.

Also, it should be noted that the differences between the steps of FIG. 12 and the steps of FIG. 7 start from the transmission of the reply packet, the description about the preceding steps S1201-S1203 is similar to that for FIG. 7. Therefore, the repeated description about steps S1201-S1203 is omitted.

At step S1204, the gateway apparatus GW transmits the reply packet RPL. After the transmission of the reply packet RPL is completed, at step S1205, the gateway apparatus GW senses the channel of the wireless distributed network, and then at step S1206, determines whether the threshold time is reached. If the threshold time is not reached, then the channel of the wireless distributed network is continuously sensed. If the threshold time is reached, at step S1207, it is detected at the end of the threshold time whether the selection packet is successfully received or not. If at the end of the threshold time, the selection packets SLT1 and SLT2 from multiple wireless terminals Ubi1 and Ubi2 are received, then at step S1208, the gateway apparatus GW transmits an acknowledgement poll packet ACK+poll1 to one of the wireless terminals for example Ubi1 to allow it to transmit to the gateway apparatus GW the data to be relayed. At step S1209, if the gateway apparatus GW successfully receives the data packet DATA1 from the polled wireless terminal Ubi1 by the distributed network reception unit 418, then at step S1210, it is determined whether the polling is finished. When there is still an un-polled wireless terminal, the flow returns to step S1208 to transmit an acknowledgement poll packet ACK+poll2 to poll the next wireless terminal Ubi2, and the same operations as above are performed. If it is determined at step S1210, that the polling is finished, the acknowledgement packet ACK is then transmitted to the wireless terminal Ubi2 at step S1211. Thereafter, at step S1212, it exits from the wireless distributed network after completing the transmission of the acknowledgement packet ACK, and at step S1213, the gateway apparatus GW transfers the data packets from the multiple wireless terminals Ubi1 and Ubi2 received from the wireless distributed network, to the base station BS in the wide area network.

Figure 13:
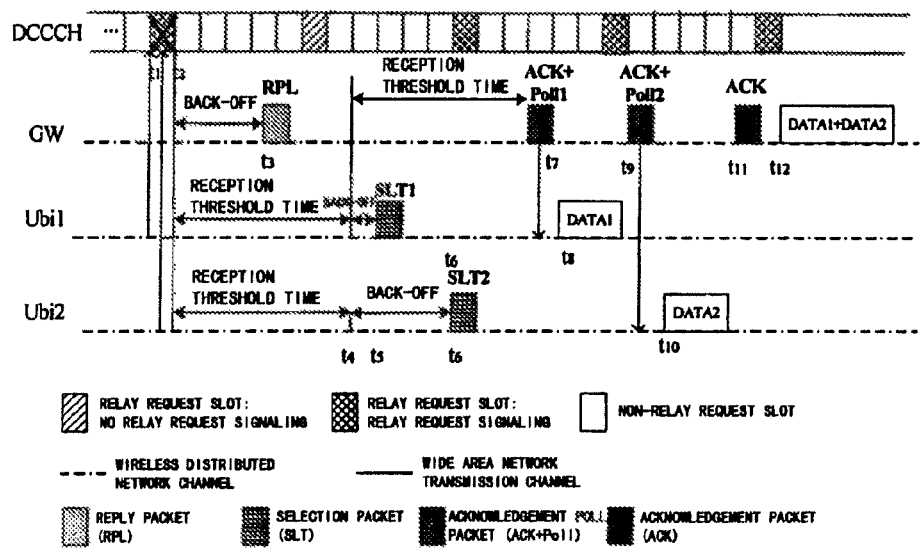
FIG. 13 is a timing diagram of respective nodes in a case where the wireless terminal successfully establishes a connection with the gateway apparatus and then transmits data in the point-to-multipoint scenario according to the first embodiment of the present invention.

FIG. 13 is a timing diagram of respective nodes in a case where the wireless terminal successfully establishes a connection with the gateway apparatus and then transmits data in the point-to-multipoint scenario according to the first embodiment of the present invention.

Also, since FIG. 13 is similar to FIG. 8 except that FIG. 13 shows a case where two wireless terminals Ubi1 and Ubi2 establish connections to one gateway apparatus GW and then the data are transferred, the description about the operations before the time instant $t_4$ is omitted. At the time instant $t_4$, the wireless terminals Ubi1 and Ubi2 both receives the reply packet RPL from the gateway apparatus GW and enter into the back-off procedures. The wireless terminals Ubi1 and Ubi2 respectively transmit the selection packets SLT1 and SLT2 after the end of the back-off procedures, indicating that they both select the gateway apparatus GW as the gateway node for relay.

The gateway apparatus GW detects that multiple selection packets SLT1 and SLT2 are received within the reception threshold time starting from the transmission of the reply packet, and after the end of the reception threshold time, at the time instant $t_7$, transmits the acknowledgement poll packet ACK+poll1 to the wireless terminal Ubi1 to allow the wireless terminal Ubi1 to transmit its data packet to be relayed. The wireless terminal Ubi1 transmits the data packet DATA1 at the time instant $t_8$, after receiving the acknowledgement poll packet ACK+poll1 directed thereto.

After successfully receiving the data packet from the wireless terminal Ubi1, the gateway apparatus GW detects that there is still an un-polled wireless terminal Ubi2, and then at the time instant $t_9$, transmits the acknowledgement poll packet ACK+poll2 to the wireless terminal Ubi2. At the time instant $t_{10}$, the wireless terminal Ubi2 transmits the data packet DATA2 after receiving the acknowledgement poll packet directed thereto. After receiving the DATA2, the gateway apparatus GW detects that all the wireless terminals have already been polled, and then at the time instant $t_{11}$, transmits the acknowledgement packet ACK to the wireless terminal Ubi2.

Thereafter, the gateway apparatus GW exits from the wireless distributed network, and at the time instant $t_{12}$, transfers to the base station BS in the wide area network, the data packets DATA1 and DATA2 from the wireless terminals Ubi1 and Ubi2 received from the wireless distributed network.

Thus, in the first embodiment of the present invention, after accessing the wireless distributed network, the gateway apparatus may perform transmissions with multiple surrounding wireless terminals in a polling manner.

The Second Embodiment

Figure 14:
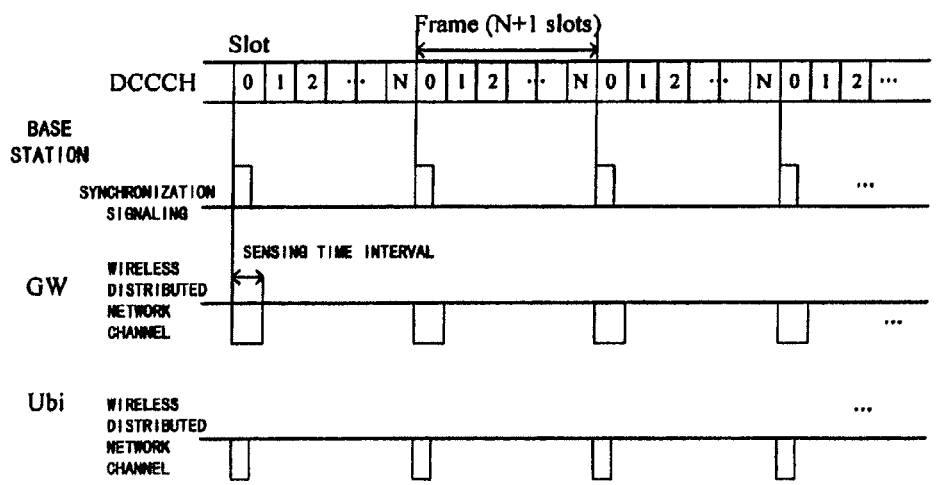
FIG. 14 is a timing diagram of the channels related with the second embodiment of the present invention.

FIG. 14 is a timing diagram of the channels related with the second embodiment of the present invention. In the second embodiment, a synchronization signaling for synchronizing with a slot in the downlink common control channel is periodically transmitted in the transmission frequency band of a wireless distributed network by a base station BS of a wide area network. The wireless terminal Ubi transmits a relay request signal when receiving the synchronization signaling, and a gateway apparatus GW starts to access the distributed network corresponding to the synchronization signaling in order to receive the relay request signal from the wireless terminal Ubi. For example, the gateway apparatus GW starts to access the distributed network at a time instant corresponding to the synchronization signaling by sensing the downlink common control channel of the wide area network.

The base station transmits control information from the wide area network through the downlink common control channel of the wide area network, such as a synchronization message, a paging message etc. Meanwhile, the base station periodically transmits the synchronization signaling on the frequency band used in the wireless distributed network, the synchronization signaling being synchronous with slot in the downlink common control channel.

The gateway apparatus in the hybrid network receives the signals on the downlink common control channel of the wide area network all the time, and enables wireless distributed network transmission unit and the distributed network reception unit at the starting time of each synchronization signaling with a period same as the synchronization signaling, detects whether there are data or request to transmit signal, and when detecting the above signal, communicates by the wireless distributed network transmission unit and the distributed network reception unit.

The wireless terminal Ubi in the hybrid network receives the synchronization signaling from the base station, and when having a traffic transmission request, transmits the relay request signal after receiving the synchronization signaling.

Figure 15A:
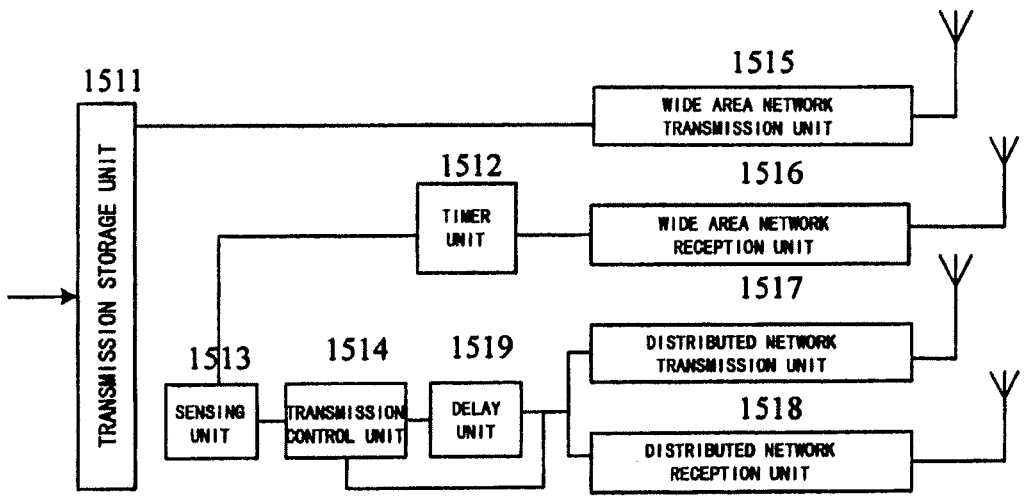
FIG. 15(*a*) is a block diagram of the gateway apparatus supporting communications in two networks in the hybrid network according to the second embodiment of the present invention.

FIG. 15 shows block diagrams of the structures of the gateway apparatus and the wireless terminal in the hybrid network according to the second embodiment of the present invention. FIG. 15(a) is a block diagram of the structure of the gateway apparatus supporting communications in two networks in the hybrid network.

As shown in FIG. 15(a), the gateway apparatus of the second embodiment includes a transmission storage unit 1511 for storing packets to be transmitted; a wide area network transmission unit 1515 for transmitting signals in the wide area network; a wide area reception unit 1516 for receiving signals from the wide area network; a distributed network transmission unit 1517 for transmitting signals in the distributed network; a distributed network reception unit 1518 for receiving signals from the distributed network; a timer unit 1512 for detecting whether the current time is an integer multiple of a periodic time, and periodically enabling a sensing unit 1513 to sense a channel of the distributed network; sensing unit 1513 for sensing the channel of the distributed network at the enabling time instant instructed by the timer unit 1512; a transmission control unit 1514 for controlling transmission and reception of signals in the distributed network according to signals received from the sensing unit 1513; and a delay unit 1519 for receiving an instruction from the transmission control unit 1514 and delaying.

When the sensing unit 1513 detects in a sensing time interval that there is a data transmission in the wireless distributed network, it instructs the transmission control unit 1514 to communicate with the surrounding wireless terminals Ubi according to a communication protocol of the wireless distributed network. When the sensing unit 1513 specifies that there is no signal detected in the sensing time interval, no operation is performed.

Figure 15B:
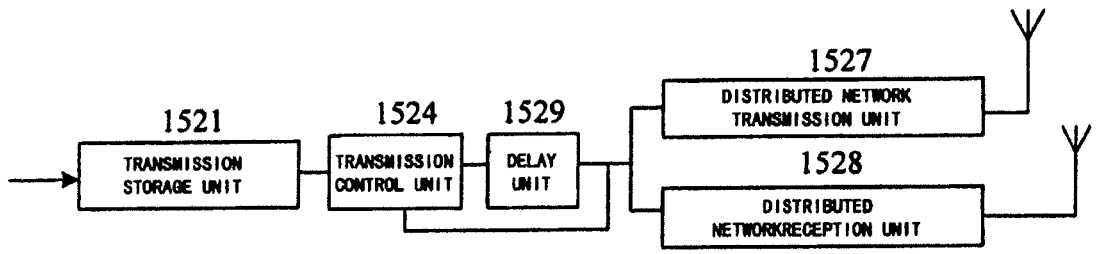

FIG. 15(b) is a block diagram of the wireless terminal Ubi only supporting transmissions in the distributed network in the hybrid network. As shown in FIG. 15(b), the functional modules of the wireless terminal according to the present embodiment are a part of the gateway apparatus shown in FIG. 15(a). The wireless terminal of the second embodiment includes a transmission storage unit 1521 for storing packets to be transmitted; a distributed network transmission unit 1527 for transmitting signals in the distributed network; a distributed network reception unit 1528 for receiving signals from the distributed network; a transmission control unit 1524 for controlling transmission and reception of signals in the distributed network, and clocking; and a delay unit 1529 for receiving an instruction from the transmission control unit 1524 and delaying.

Figure 16:
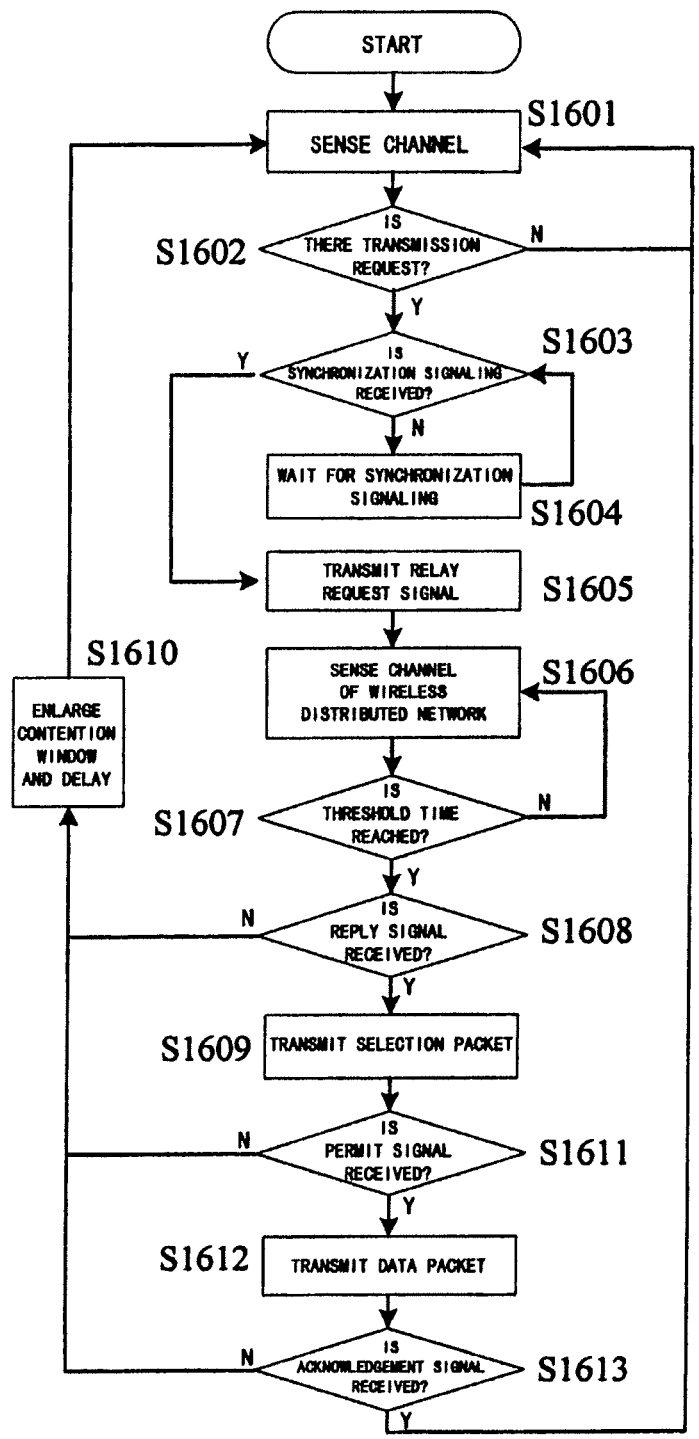
FIG. 16 is a detail flowchart of operation on the wireless terminal side in a case where the gateway apparatus performs a point-to-point transmission with the wireless terminal in the hybrid network according to the second embodiment of the present invention.

FIG. 16 is a detail flowchart of operation on the wireless terminal side in a case where the gateway apparatus performs a point-to-point transmission with the wireless terminal in the hybrid network according to the second embodiment of the present invention.

At step S1601, the wireless terminal Ubi in the hybrid network is in an idle state and periodically senses synchronization signaling from the base station. This is because the synchronization signaling information transmitted by the base station is transmitted on the frequency band with which the wireless distributed network operates. At step S1602, it is determined whether there is a traffic transmission request or not, that is, whether there are data and signals to be transmitted in the transmission storage unit 1521 or not. When there is the traffic transmission request, at step S1603, the transmission control unit 1524 determines whether a synchronization signaling is received or not. If not, then at step S1604, the wireless terminal Ubi waits for the next synchronization signaling. If the synchronization signaling is received, then at step S1605, the distributed network transmission unit 1527 transmits a relay request signal at the ending instant of the synchronization signaling.

Thereafter, at step S1606, the wireless distributed network transmission unit 1527 and reception unit 1528 sense the wireless distributed network channel. At step S1607, if the sensed time reaches a threshold time, then at step S1608, it is detected whether a reply packet RPL is received within this period or not. If not, then at step S1610, the contention window is enlarged, the channel is sensed after delaying a certain period, and the relay request signal is retransmitted.

If the reply packets RPL are received, then at step S1609, the transmission control unit 1524 selects one relay node (gateway apparatus) from the plurality of received replay packets, and transmits a selection packet SLT to the selected node. After the transmission of the selection packet SLT is completed, it is determined at step S1611 whether a permit packet PMT is received or not. If the permit packet PMT is received, then a data packet is transmitted at step S1612.

Thereafter, at step S1613, the transmission control unit 1524 determines whether an acknowledgement packet ACK is received or not. After the acknowledgement packet ACK is received, the flow returns to step S1601, and the channel is subsequently sensed for next transmission. Otherwise, at step S1610, the contention window is enlarged, and the flow returns to step S1601 after delaying a certain period, and the above processes are repeated.

Figure 17:
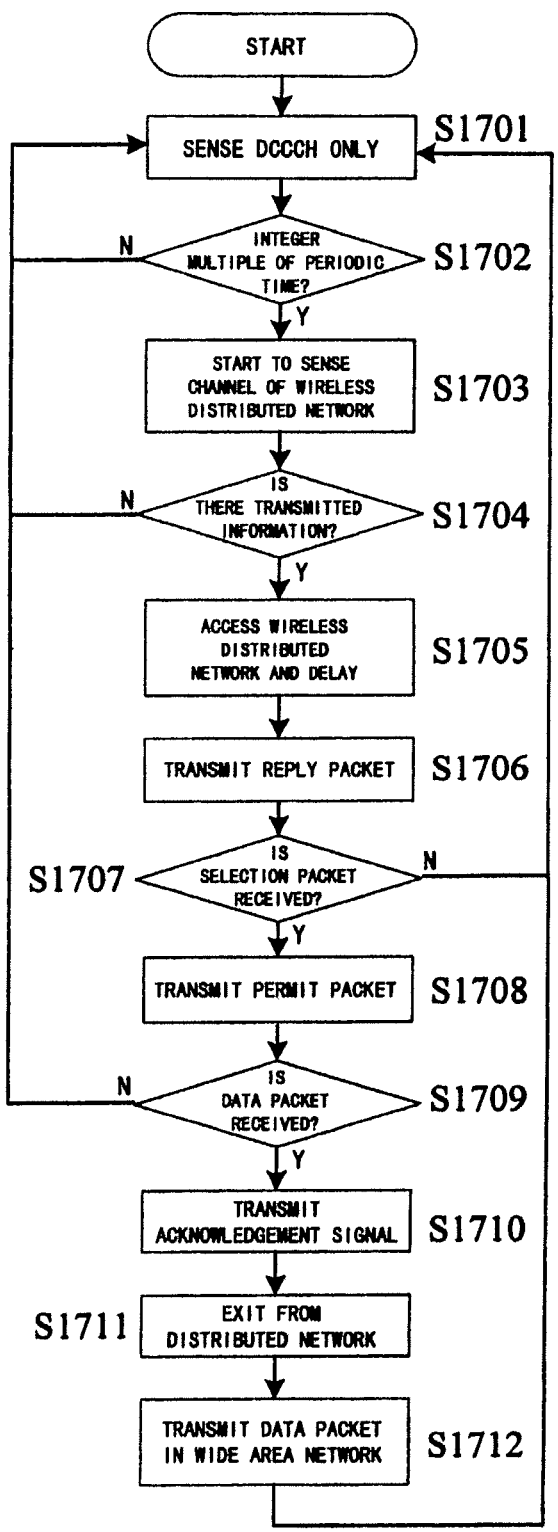
FIG. 17 is a detail flowchart of operation on the gateway apparatus side in a case where the gateway apparatus performs a point-to-point transmission with the wireless terminal in the hybrid network according to the second embodiment of the present invention.

FIG. 17 is a detail flowchart of operation on the gateway apparatus side in a case where the gateway apparatus performs a point-to-point transmission with the wireless terminal in the hybrid network according to the second embodiment of the present invention.

At step S1701, the gateway apparatus GW in the hybrid network is in an idle state and only senses signals of the downlink common control channel of the wide area network from a base station. At step S1702, the timer unit 1512 determines whether current time is an integral multiple of the period of the synchronization signaling or not. At step S1703, in a case where the current time is an integral multiple of the period (here, the period refers to the transmission period of the synchronization signaling), the transmission control unit 1514 enables the wireless distributed network reception unit 1518 and senses the channel. At step S1704, it is determined whether there are signals to be transmitted. When it is detected that there are data or a request to transmit signals on the channel, at step S1705, the wireless distributed network transmission unit 1517 and the distributed network reception unit 1518 are enabled to access the wireless distributed network, and the delay unit 1519 is enabled for delaying a certain period. Thereafter, at step S1706, a reply packet RPL is transmitted by the wireless distributed network transmission unit 1517 in the wireless distributed network.

If the transmission of the reply packet RPL is completed, it is determined at step S1707 whether a selection packet SLT is received from surrounding wireless terminals. At step S1708, if the selection packet SLT directed to the gateway apparatus is received, then a permit packet PMT is transmitted.

If no signal is detected in a certain time interval, then the wireless distributed network transmission unit 1517 and the distributed network reception unit 1518 are turned off, and only the DCCCH is sensed. After the transmission of the permit packet PMT is completed, it is determined at step S1709 whether a data packet is received. If the data packet is successfully received, then an acknowledgement packet ACK is transmitted at step S1710, and then at step S1711, it exits from the distributed network, and at step S1712, it begins to access the transmission channel in the wide area network for transmitting the data packet.

Figure 18:
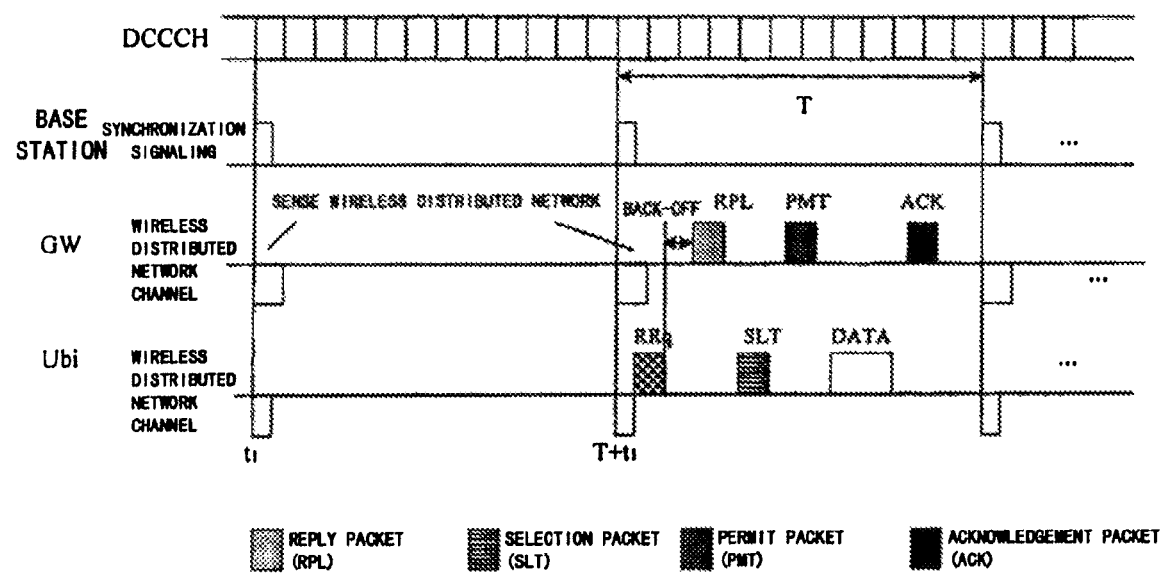
FIG. 18 is a timing diagram of respective nodes in a case where the wireless terminal successfully establishes a pointto-point connection with the gateway apparatus and then transmits data according to the second embodiment of the present invention.

FIG. 18 is a timing diagram of respective nodes according to the second embodiment of the present invention. For illustration, only the timing relationship between one gateway apparatus GW and the wireless terminal Ubi is given. However, there are always a plurality of gateway apparatuses around the wireless terminal Ubi, for example, gateway apparatuses GW1 and GW2. The base station transmits the synchronization signaling in the wireless distributed network at the time instants $t_1$, $(T+t_1)$, . . . with a period of T. At the same time, the wireless terminal Ubi receives the synchronization signaling within the wireless distributed network with the same period. The gateway apparatuses GW1 and GW2 enable the wireless distributed network transmission unit and the distributed network reception unit with the same period to sense the channel. The wireless terminal Ubi generates the traffic transmission request within a time interval from $t_1$ to $(T+t_1)$, that is, there are data and signals to be transmitted in the transmission storage unit 1521, and then after receiving the synchronization signaling at the time instant $(T+t_1)$, transmits the relay request packet by the wireless distributed network transmission unit 1527.

Since at the time instant $(T+t_1)$, the gateway apparatuses GW1 and GW2 are both sensing signals from the DCCCH of the wide area network and the channel of the wireless distributed network, they receives the relay request signal from the wireless terminal Ubi. After the reception of the signals is received, the delay units 1519 are enabled for entering into the back-off procedures to randomly delaying a certain period. At the ending instant of the delay, the wireless distributed network transmission unit 1517 and the distributed network reception unit 1518 are enabled to transmit the reply packet RPL.

When the transmission control unit 1514 specifies that the reception threshold time is reached, the wireless terminal Ubi determines whether the reply packet RPL is received or not, the reply packet RPL containing channel information of the current gateway apparatus to the base station BS and the wireless terminal. Thereafter, the conditions of channel to the base station BS indicated in the received reply packets RPL are compared, and the gateway apparatus GW2 that has the best condition of channel to the base station BS and needs the lowest transmission power for the direct communication with the base station BS is selected as the relay apparatus of the wireless terminal Ubi. Thereafter, the selection packet SLT is transmitted by the distributed network transmission unit 1527 and contains an address of the selected gateway apparatus, for example an address of the gateway apparatus GW2. For example, the wireless terminal Ubi selects the gateway apparatus with the largest signal to interference and noise ratio (SINR) or the nearest distance according to power measurements in order to determine the most appropriate relay gateway.

Next, when the gateway apparatus GW1 receives the selection packet SLT from the wireless terminal Ubi, it detects that the packet is not a packet directed thereto and thus turns off the distributed network transmission unit 1517 and the distributed network reception unit 1518 and enters into the idle state. The gateway apparatus GW2 receives the selection packet SLT from the wireless terminal Ubi, and detects that the packet is a packet directed thereto. Then, the gateway apparatus GW2 transmits the permit packet PMT by the distributed network transmission unit 1517 to indicate that it is ready to receive and relay the data packet from the wireless terminal Ubi.

Then, the wireless terminal Ubi receives the permit packet PMT from the gateway apparatus GW2. The wireless terminal Ubi transmits to the gateway apparatus GW2 the data packet to be transmitted by the distributed network transmission unit 1527, and after completing the transmission of the data packet, terminates the transmission.

Next, the gateway apparatus GW2 successfully receives the data packet from the wireless terminal Ubi by the distributed network reception unit 1518 so that the acknowledgement packet ACK is transmitted, and when completing the transmission of the acknowledgement packet ACK, turns off the distributed network transmission unit 1527 and the distributed network reception unit 1528 for preparing for the data transmission in the wide area network.

The gateway apparatus GW2 successfully connects to the transmission channel of the wide area network and begins to transmit the data packet received from the wireless terminal Ubi.

Although the operations performed in a case where the gateway apparatus and the wireless terminal establish a point-to-point connection according to the second embodiment of the present invention have been described, the present invention is not limited thereto. In the present invention, one gateway apparatus may simultaneously establish connections to multiple wireless terminals, that is to say, establish a point-to-multipoint connection in order to relay the data transmissions for the multiple wireless terminals in a polling manner.

Figure 19:
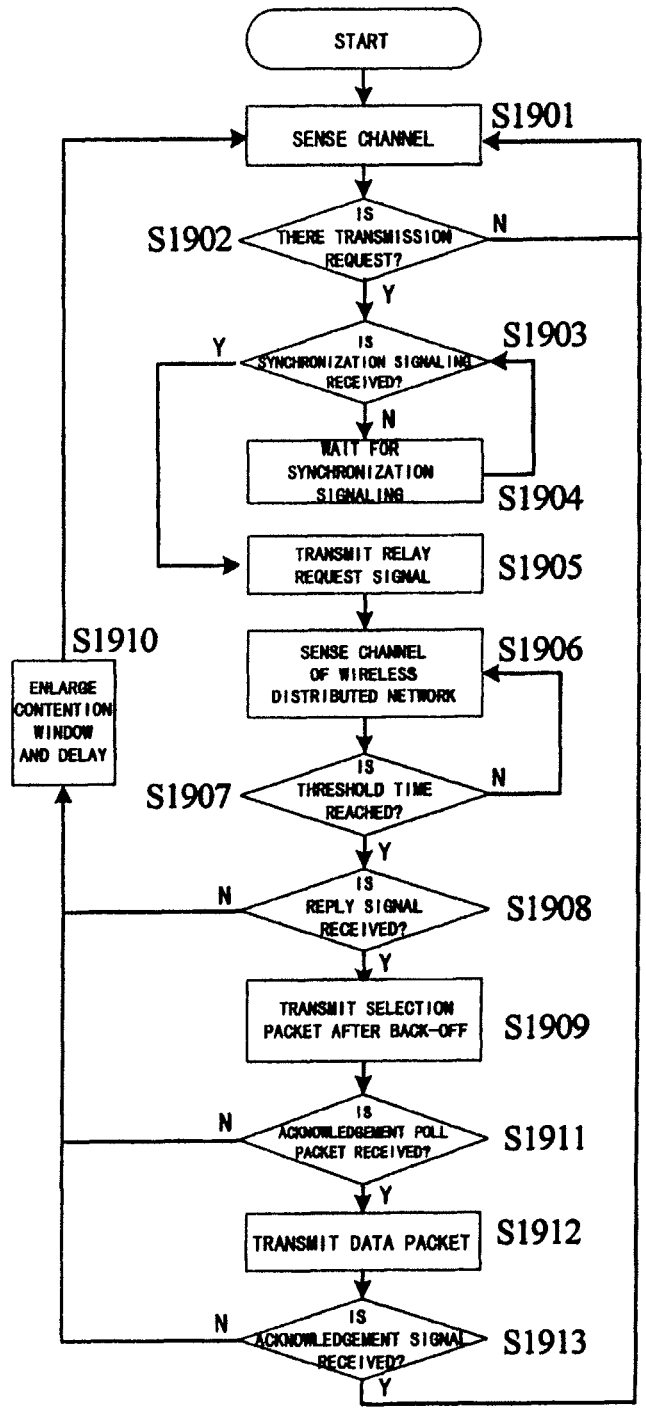
FIG. 19 is a detail flowchart of operation on the wireless terminal side in a case where the gateway apparatus performs a point-to-multipoint transmission with multiple wireless terminals in the hybrid network according to the second embodiment of the present invention.

FIG. 19 is a detail flowchart of operation on the wireless terminal side in a case where the gateway apparatus performs a point-to-multipoint transmission with multiple wireless terminals in the hybrid network according to the second embodiment of the present invention.

It should be noted that the differences between FIG. 19 and FIG. 16 start from the reception of the reply signal, the description about the preceding steps S1901-S1907 is similar to that for FIG. 6. Therefore, the repeated description about steps S1901-S1907 is omitted.

At step S1908, the wireless terminals receive the reply packet from the gateway apparatus GW. Then, at step S1909, the wireless terminals enable the delay units 1529 to enter into the back-off procedures, and transmit the selection packets SLT after certain periods of back-off. At step S1911, it is determined whether acknowledgement poll packets ACK+poll are received from the gateway apparatus GW. If the wireless terminals receive acknowledgement poll packets ACK+poll after the threshold time, then they sequentially transmit the data packets to the gateway apparatus which transmitted the poll packets at step S1912.

Thereafter, at step S1913, the transmission control unit 1524 determines whether the acknowledgment packets ACK are received. After the acknowledgement packets ACK are received, the flow returns to step S1901, and the channel is subsequently sensed for the next transmission. Otherwise, at step S1910, the contention window is enlarged, the flow returns to step S1901 after delaying certain periods, and the above processes are repeated.

Figure 20:
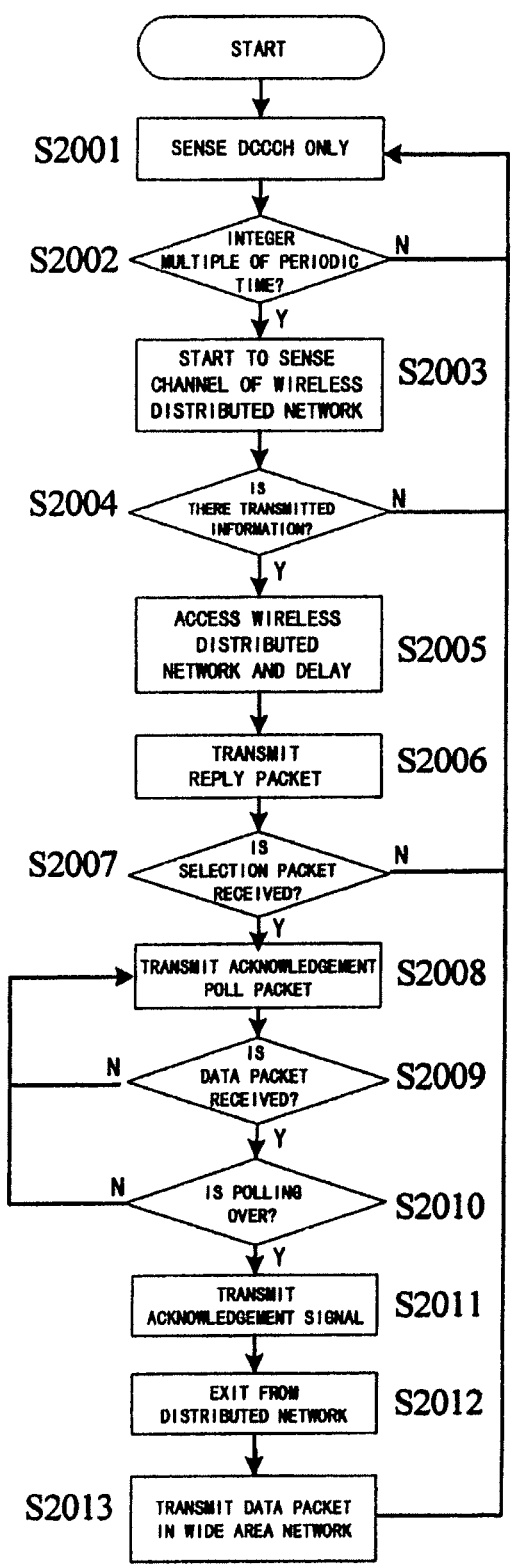
FIG. 20 is a detail flowchart of the relaying operation on the gateway apparatus side in a case where the gateway apparatus performs a point-to-multipoint transmission with multiple wireless terminals in the hybrid network according to the second embodiment of the present invention.

FIG. 20 is a detail flowchart of the relaying operation on the gateway apparatus side in a case where the gateway apparatus performs a point-to-multipoint transmission with multiple wireless terminals in the hybrid network according to the second embodiment of the present invention.

Also, it should be noted that the differences between FIG. 20 and FIG. 17 start from the transmission of the reply packet, the description about the preceding steps S2001-S2005 is similar to that for FIG. 17. Therefore, the repeated description about steps S2001-S2005 is omitted.

At step S2006, the gateway apparatus GW transmits the reply packet RPL. After the transmission of the reply packet RPL is completed, at step S2007, it is detected whether a selection packet is successfully received. If the selection packets SLT1 and SLT2 from multiple wireless terminals Ubi1 and Ubi2 are successfully received, then at step S2008, the gateway apparatus GW transmits an acknowledgement poll packet ACK+poll1 to one of the wireless terminals for example Ubi1 to allow it to transmit to the gateway apparatus GW the data to be relayed. At step S2009, if the gateway apparatus GW successfully receives the data packet DATA1 from the polled wireless terminal Ubi1 by the distributed network reception unit 1518, then at step S2010, it is determined whether the polling is finished. When there is still an un-polled wireless terminal, the flow returns to step S2008 to transmit an acknowledgement poll packet ACK+poll2 to poll the next wireless terminal Ubi2. The same operations as above are performed. If it is determined at step S2010 that the polling is finished, the acknowledgement packet ACK is then transmitted to the wireless terminal Ubi2 at step S2011. Thereafter, at step S2012, it exits from the wireless distributed network after completing the transmission of the acknowledgement packet ACK, and at step S2013, the gateway apparatus GW transfers the data packets from the multiple wireless terminals Ubi1 and Ubi2 received from the wireless distributed network, to the base station BS in the wide area network.

Figure 21:
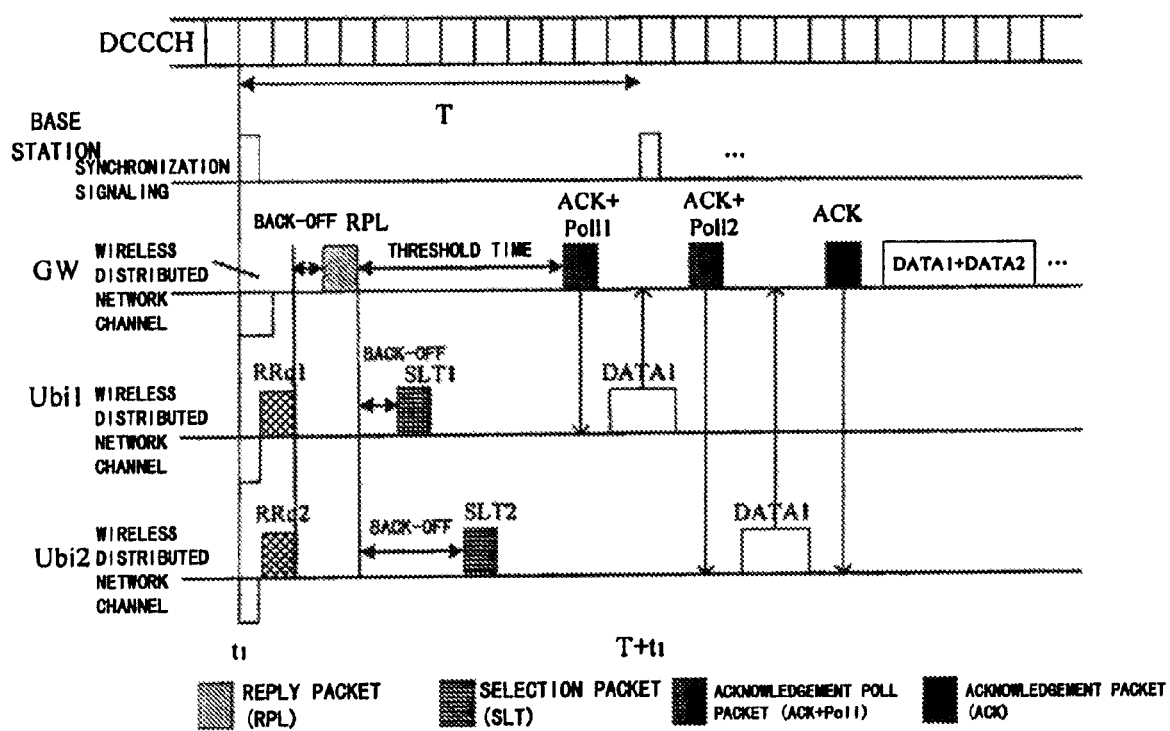
FIG. 21 is a timing diagram of respective nodes in a case where the wireless terminal successfully establishes a point-to-multipoint connection with the gateway apparatus and then transmits data according to the second embodiment of the present invention.

FIG. 21 is a timing diagram of respective nodes in a case where the wireless terminal successfully establishes a point-to-multipoint connection with the gateway apparatus and then transmits data according to the second embodiment of the present invention.

Similar to FIG. 18, the base station transmits the synchronization signaling in the wireless distributed network at the time instants $t_1$, $(T+t_1)$, ... with a period of T. At the same time, the wireless terminals Ubi1 and Ubi2 receive the synchronization signaling within the wireless distributed network with the same period. The gateway apparatus GW enables the wireless distributed network transmission unit 1517 and the distributed network reception unit and 1518 with the same period to sense the channel. The wireless terminals Ubi1 and Ubi2 generate the traffic transmission requests prior to $t_1$, that is, there are data and signals to be transmitted in the transmission storage unit 1521, and then after receiving the synchronization signaling at the time instant $t_1$, respectively transmit the relay request packets RRq1 and RRq2 by the wireless distributed network transmission units 1527.

After receiving the relay request packets RRq1 and RRq2, the gateway apparatus GW transmits the reply packet RPL to the wireless terminals Ubi1 and Ubi2. After receiving the replay packet from the gateway apparatus GW, the wireless terminals Ubi1 and Ubi2 enable the delay unit 1529 for entering into the back-off procedures. After delaying certain periods, the wireless terminals Ubi1 and Ubi2 respectively transmits the selection packet SLT1 and SLT2 indicating that the gateway apparatus GW is selected as relay gateway apparatuses thereof.

The gateway apparatus GW detects that multiple selection packets SLT1 and SLT2 are received within the reception threshold time starting from the transmission of the reply packet, and after the end of the reception threshold time, transmits the acknowledgement poll packet ACK+poll1 to the wireless terminal Ubi1 to allow the wireless terminal Ubi1 to transmit its data packet to be relayed. The wireless terminal Ubi1 transmits the data packet DATA1 after receiving the acknowledgement poll packet ACK+poll1 directed thereto.

After successfully receiving the data packet from the Ubi1, the gateway apparatus GW detects that there is still an un-polled wireless terminal Ubi2, and then transmits the acknowledgement poll packet ACK+poll2 to the wireless terminal Ubi2. The wireless terminal Ubi2 transmits the data packet DATA2 after receiving the acknowledgement poll packet directed thereto. After receiving the DATA2, the gateway apparatus GW detects that all the wireless terminals have already been polled, and then transmits the acknowledgement packet ACK to the Ubi2.

Thereafter, the gateway apparatus GW exits from the wireless distributed network, and transfers to the base station BS in the wide area network, the data packets DATA1 and DATA2 from the Ubi1 and Ubi2 received from the wireless distributed network.

Thus, in the second embodiment of the present invention, after accessing the wireless distributed network, the gateway apparatus may perform transmissions with multiple surrounding wireless terminals in a polling manner.

In the second embodiment, the synchronization signaling for synchronizing with the downlink common control channel is regularly transmitted on the transmission frequency band of the wireless distributed network by the base station of the wide area network. After receiving the synchronization signaling, the wireless terminal Ubi transmits the relay request signal, and the gateway apparatus only needs to enable the access to the distributed network at the time instant corresponding to the synchronization signaling in order to receive the relay request signal from the wireless terminal Ubi. Therefore, the gateway apparatus only senses the distributed network intermittently, and thus the power consumption is reduced, and the serving time of the gateway node is increased.

As described above, according to the second embodiment, in the hybrid network of the wide area network and the wireless distributed network, the base station has the functionality of transmitting the synchronization signaling in the wireless distributed network. The synchronization signaling is kept synchronous with the downlink common control channel in the wide area network. The Ubi node in the network is periodically awaken by receiving the synchronization signaling information from the base station, and when having the traffic transmission request, begins to transmit the data or packet request signal after receiving the synchronization signaling. The gateway node in the network periodically enables and senses the channel of the wireless distributed network according to the timing information provided on the downlink common control channel of the wide area network. When sensing that there is signal in the wireless distributed network, communicates with the Ubi node, and when completing the communication, the gateway node turns off the transceiver means for the distributed network, and transfers the previously received packets to the wide area network. In this manner, the gateway node in the network may conveniently receive the relay request signal from the single-mode terminal, save its power consumption, and it is feasible to transmit the synchronization signaling by the base station.

In addition, in the first and second embodiments as described above, although the wide area network transmission unit and the wide area network reception unit, as well as the distributed network transmission unit and the distributed network reception unit are described in a separated form, those skilled in the art can also integrate them together as one part during implementation. Similarly, the DCCCH transmission unit and the DCCCH reception unit, and the distributed network transmission unit and the distributed network reception unit in the wireless terminal can also be implemented respectively as one part.

Although the embodiments of the present invention have been described, the protection scope of the present invention is not limited thereto. Those changes or substitutions which can be realized by those skilled in the art according to the disclosure of the present invention should be included therein. Consequently, the protection scope of the present invention is solely defined by the appended claims.

The invention claimed is:

1. A method for establishing a wireless connection at a gateway apparatus which communicates with a base station in a wireless Wide Area Network (WAN), the method comprising steps of:
  sensing a downlink common control channel of the WAN to determine whether the downlink common control channel has a relay request slot;
  receiving a relay request message requesting to relay a data packet, in the relay request slot on the downlink common control channel, in case that the downlink common control channel has the relay request slot;
  establishing a wireless connection with a wireless terminal in a wireless distributed network in response to the relay request message, wherein establishing a wireless connection with the wireless terminal comprises
    transmitting a reply message to the wireless terminal after receiving the relay request message,
    receiving a selection message transmitted by the wireless terminal, the selection message contains an address of the gateway apparatus through which a relay operation is to be made, and
    in response to the selection message, transmitting to the wireless terminal a permit message to permit the wireless terminal transmitting the data packet to be relayed; and
  transmitting the reply message to the wireless terminal in the wireless distributed network after detecting that a power level on the relay request slot is larger than a noise power.

2. A method for establishing a wireless connection at a gateway apparatus which communicates with a base station in a wireless Wide Area Network (WAN), the method comprising steps of:
  sensing a downlink common control channel of the WAN to determine whether the downlink common control channel has a relay request slot;
  receiving a relay request message requesting to relay a data packet, in the relay request slot on the downlink common control channel, in case that the downlink common control channel has the relay request slot;
  establishing a wireless connection with a wireless terminal in a wireless distributed network in response to the relay request message, wherein establishing a wireless connection with the wireless terminal comprises
    transmitting a reply message to the wireless terminal after receiving the relay request message,
    receiving a selection message transmitted by the wireless terminal, the selection message contains an address of the gateway apparatus through which a relay operation is to be made, and
    in response to the selection message, transmitting to the wireless terminal a permit message to permit the wireless terminal transmitting the data packet to be relayed; and
  transmitting the reply message to the wireless terminal in the wireless distributed network, after detecting a high level on the relay request slot.

3. The method according to claim 1, wherein the gateway apparatus performs data packet transmissions with multiple wireless terminals around in a polling manner.

4. A method for establishing a wireless connection at a wireless terminal, the method comprising steps of:

sensing a downlink common control channel of a wireless Wide Area Network (WAN) to determine whether the downlink common control channel has a relay request slot;
transmitting a relay request message requesting to relay a data packet, in the relay request slot on the downlink common control channel, in case that the downlink common control channel has the relay request slot;
receiving a reply message on a wireless distributed channel transmitted by a gateway apparatus which communicates with a base station of the WAN; and
establishing a wireless connection with the gateway apparatus in a wireless distributed network in response to the reply message by
determining the gateway apparatus through which a relay operation is to be made by measuring conditions of channels, wherein the wireless terminal compares channel conditions indicated in the reply message and selects a gateway apparatus based at least in part on a gateway apparatus with a best channel condition and which needs a lowest transmission power for directly communicating therewith as the gateway apparatus through which the relay operation is to be made, and
transmitting a selection message which contains an address of the gateway apparatus through which the relay operation is to be made.

5. A method for establishing a wireless connection at a wireless terminal, the method comprising steps of:
sensing a downlink common control channel of a wireless Wide Area Network (WAN) to determine whether the downlink common control channel has a relay request slot;
transmitting a relay request message requesting to relay a data packet, in the relay request slot on the downlink common control channel, in case that the downlink common control channel has the relay request slot;
receiving a reply message on a wireless distributed channel transmitted by a gateway apparatus which communicates with a base station of the WAN; and
establishing a wireless connection with the gateway apparatus in a wireless distributed network in response to the reply message by
determining the gateway apparatus through which a relay operation is to be made by measuring conditions of channels, wherein the wireless terminal compares channel conditions indicated in the reply message, and selects a gateway apparatus based at least in part on a gateway apparatus with a best channel condition and with a highest signal to interference and noise ratio (SINR) as the gateway apparatus through which the relay operation is to be made, and
transmitting a selection message which contains an address of the gateway apparatus through which the relay operation is to be made.

6. The method according to claim 4, wherein the wireless terminal selects a nearest gateway apparatus as the gateway apparatus through which the relay operation is to be made.

7. A gateway apparatus which communicates with a base station in a wireless Wide Area network (WAN), comprising:
a wireless wide area network transceiving unit configured to transmit and receive messages in the wireless wide area network;
a wireless distributed network transceiving unit configured to transmit and receive messages in a wireless distributed network;
a detection unit configured to detect the messages received by the wireless wide area network transceiving unit on a downlink common control channel of the WAN, and determine whether the downlink common control channel has a relay request slot;
an access determination unit configured to determine that a wireless terminal needs to access the wireless distributed network in case that the detection unit detects a relay request slot and a relay request message is received on the relay request slot; and
a transmission control unit configured to instruct the wireless distributed network transceiving unit to transmit a reply message to establish a wireless connection with the wireless terminal in the wireless distributed network,
wherein the wireless distributed network transceiving unit is further configured to
transmit a reply message to the wireless terminal after receiving the relay request message,
receive a selection message transmitted by the wireless terminal and containing an address of the gateway apparatus through which a relay operation is to be made,
transmit to the wireless terminal a permit message to permit the wireless terminal transmitting the data packet to be relayed in response to the selection message,
transmit the reply message to the wireless terminal in the wireless distributed network, after the detection unit detects that a power level on the relay request slot is larger than a noise power.

8. A gateway apparatus which communicates with a base station in a wireless Wide Area network (WAN), comprising:
a wireless wide area network transceiving unit configured to transmit and receive messages in the wireless wide area network;
a wireless distributed network transceiving unit configured to transmit and receive messages in a wireless distributed network;
a detection unit configured to detect the messages received by the wireless wide area network transceiving unit on a downlink common control channel of the WAN, and determine whether the downlink common control channel has a relay request slot;
an access determination unit configured to determine that a wireless terminal needs to access the wireless distributed network in case that the detection unit detects a relay request slot and a relay request message is received on the relay request slot; and
a transmission control unit configured to instruct the wireless distributed network transceiving unit to transmit a reply message to establish a wireless connection with the wireless terminal in the wireless distributed network,
wherein the wireless distributed network transceiving unit is further configured to
transmit a reply message to the wireless terminal after receiving the relay request message,
receive a selection message transmitted by the wireless terminal and containing an address of the gateway apparatus through which a relay operation is to be made,
transmit to the wireless terminal a permit message to permit the wireless terminal transmitting the data packet to be relayed in response to the selection message, and
transmit the reply message to the wireless terminal in the wireless distributed network, after the detection unit detects a high level on the relay request slot.

9. The gateway apparatus according to claim 7, wherein the gateway apparatus performs data packet transmissions with multiple wireless terminals around in a polling manner.

10. A wireless terminal comprising:
- a wireless distributed network transceiving unit configured to transmit and receive messages in a wireless distributed network;
- a downlink common control channel transceiving unit configured to transmit a relay request message requesting to relay a data packet and receive messages on a downlink common control channel of a wireless wide area network (WAN);
- a detection unit configured to detect the messages received by the downlink common control channel transceiving unit on the downlink common control channel, and determine whether the downlink common control channel has a relay request slot;
- an access determination unit configured to instruct the wireless terminal to access the wireless distributed network in case that the detection unit detects a relay request slot and a data packet is to be relayed; and
- a transmission control unit configured to instruct the downlink common control channel transceiving unit to transmit a relay request message requesting to relay a data packet, instruct the wireless distributed network transceiving unit to receive on the wireless distributed channel a reply message which is transmitted by a gateway apparatus which communicate with a base station in a wireless wide area network, and establish a wireless connection with the gateway apparatus in the wireless distributed network, and
- wherein the detection unit is further configured to determine the gateway apparatus through which a relay operation is to be made by measuring channel conditions, and the wireless distributed network transceiving unit is further configured to transmit a selection message which contains an address of the gateway apparatus through which the relay operation is to be made, and
- wherein the wireless terminal compares conditions of channels indicated in the reply message, and selects a gateway apparatus with a best channel condition and which needs a lowest transmission power for directly communicating therewith as the gateway apparatus through which the relay operation is to be made.

11. A wireless terminal comprising:
- a wireless distributed network transceiving unit configured to transmit and receive messages in a wireless distributed network;
- a downlink common control channel transceiving unit configured to transmit a relay request message requesting to relay a data packet and receive messages on a downlink common control channel of a wireless wide area network (WAN);
- a detection unit configured to detect the messages received by the downlink common control channel transceiving unit on the downlink common control channel, and determine whether the downlink common control channel has a relay request slot;
- an access determination unit configured to instruct the wireless terminal to access the wireless distributed network in case that the detection unit detects a relay request slot and a data packet is to be relayed; and
- a transmission control unit configured to instruct the downlink common control channel transceiving unit to transmit a relay request message requesting to relay a data packet, instruct the wireless distributed network transceiving unit to receive on the wireless distributed channel a reply message which is transmitted by a gateway apparatus which communicate with a base station in a wireless wide area network, and establish a wireless connection with the gateway apparatus in the wireless distributed network, and
- wherein the detection unit is further configured to determine the gateway apparatus through which a relay operation is to be made by measuring conditions of channels, and the wireless distributed network transceiving unit is further configured to transmit a selection message which contains an address of the gateway apparatus through which the relay operation is to be made, and
- wherein the wireless terminal compares channel conditions indicated in the reply message, and selects a gateway apparatus with a best channel condition and with a highest signal to interference and noise ratio as the gateway apparatus through which the relay operation is to be made.

12. The wireless terminal according to claim 10, wherein the wireless terminal selects a nearest gateway apparatus as the gateway apparatus through which the relay operation is to be made.

* * * * *